(12) United States Patent
Li et al.

(10) Patent No.: US 9,762,362 B2
(45) Date of Patent: Sep. 12, 2017

(54) MULTI-HOP PEER-TO-PEER COMMUNICATIONS

(71) Applicant: Convida Wireless, LLC, Wilmington, DE (US)

(72) Inventors: Hongkun Li, Malvern, PA (US); Zhuo Chen, Claymont, DE (US); Chonggang Wang, Princeton, NJ (US); Qing Li, Princeton Junction, NJ (US); Paul L. Russell, Jr., Pennington, NJ (US); Tao Han, North Arlington, NJ (US)

(73) Assignee: Convida Wireless, LLC, Wilmington, DE (US)

(*) Notice: Subject to any disclaimer, the term of this patent is extended or adjusted under 35 U.S.C. 154(b) by 166 days.

(21) Appl. No.: 14/644,777

(22) Filed: Mar. 11, 2015

(65) Prior Publication Data

US 2015/0263833 A1    Sep. 17, 2015

Related U.S. Application Data

(60) Provisional application No. 61/951,261, filed on Mar. 11, 2014.

(51) Int. Cl.
*H04L 5/00* (2006.01)
*H04L 12/403* (2006.01)
*H04L 29/08* (2006.01)
*H04W 74/04* (2009.01)
*H04W 4/00* (2009.01)

(52) U.S. Cl.
CPC .......... *H04L 5/0035* (2013.01); *H04L 12/403* (2013.01); *H04L 67/104* (2013.01); *H04W 4/005* (2013.01); *H04W 74/04* (2013.01)

(58) Field of Classification Search
None
See application file for complete search history.

(56) References Cited

U.S. PATENT DOCUMENTS

| | | | |
|---|---|---|---|
| 2005/0176401 A1* | 8/2005 | Nanda | H04W 52/367 455/403 |
| 2009/0034447 A1 | 2/2009 | Yu | |
| 2009/0190542 A1* | 7/2009 | Akiyama | H04W 56/002 370/329 |
| 2010/0290379 A1* | 11/2010 | Bahk | H04W 52/0216 370/311 |

OTHER PUBLICATIONS

3rd Generation Partnership Project (3GPP); S1-120059, "Suggested D2D Terminologies (Operator Managed, Operator Assisted, Operator Free)", 3GPP TSG-SA WG1 Meeting #57, Kyoto, Japan, Feb. 13-17, 2012, 3 pages.
Heile et al, "Wireless Medium Access Control (MAC) and Physical Layer (PHY) Specifications for Peer Aware Communications(PAC)", IEEE P802.15.8, Feb. 8, 2012, 2 pages.

(Continued)

*Primary Examiner* — Brian Roberts
(74) *Attorney, Agent, or Firm* — Baker & Hostetler LLP

(57) ABSTRACT

Frame structures may be designed and channels may be allocated in a manner to support multi-hop for fully distributed and infrastructure-less peer-to-peer communications in proximity. Frame structures may have a dedicated multi-hop period near the end of a superframe.

20 Claims, 28 Drawing Sheets

(56) References Cited

OTHER PUBLICATIONS

IEEE Standard for Information Technology—Telecommunications and Information Exchange Between Systems; Local and metropolitan area networks—Specific Requirements; Part 11: Wireless LAN Medium Access Control (MAC) and Physical Layer (PHY) Specifications; IEEE Computer Society, IEEE Std 802.11, Mar. 29, 2012.
IEEE Standard for Local and metropolitan area networks; Part 15.4: Low-Rate Wireless Personal Area Networks (LR-WPANs); Amendment 6: TV White Space Between 54 MHz and 862 MHz Physical Layer; IEEE Computer Society; IEEE Std 802.15.4m—Mar. 27, 2014.
IEEE Standard for Local and metropolitan area networks; Part 15.4: Low-Rate Wireless Personal Area Networks (LR-WPANs); Amendment 5: Physical Layer Specifications for Low Energy, Critical Infrastructure Monitoring Networks; IEEE Std 802.15.4k, Jun. 14, 2013.
IEEE Standard for Local and Metropolitan Area Networks—Part 15.4: Low-Rate Wireless Personal Area Networks (LR-WPANs), IEEE Std 802.15.4-2011, Sep. 5, 2011, 314 pages.
International Application No. PCT//US2015/019919: International Search Report and the Written Opinion dated Jun. 1, 2015, 12 pages.
Lee, M., "PAC Introduction", IEEE 802.15-12-0004-01-0pac, Jan. 18, 2012, 20 pages.
Lee, M., "Peer Aware Communications (PAC) Study Group 5 Criteria", IEEE P802.15-12-0064-01, Jan. 20, 2012, 4 pages.
Li et al, IEEE P802.15 Working Group for Wireless Personal Area Networks (WPANs); Letter ballot for 802.154e draft; May 2010, 4 pages.
Seong-Soon Joo, "Proposed Resolution LB85 CID284-287", IEEE SA Mentor, 882.15.4k, Nov. 1, 2012, 1-32.
Seung-Hoon Park, "TG8 PAC Framework Document", (draft), IEEE-SA Mentor, 802.15.8, No. 5, Nov. 12, 2013, 1-104.

\* cited by examiner

MULTI-HOP PEER-TO-PEER COMMUNICATIONS

CROSS REFERENCE TO RELATED APPLICATIONS

This application claims benefit under 35 U.S.C. §119(e) of Provisional U.S. Patent Application No. 61/951,261, filed Mar. 11, 2014, entitled "METHODS OF MULTI-HOP FRAME FORMATION FOR PEER-TO-PEER COMMUNICATIONS", the contents of which is incorporated herein by reference in its entirety.

BACKGROUND

The Internet of Things (IoT) introduces objects or things to Human-to-Human (H2H) based Internet services. It marks a stage of the Internet where physical or virtual objects are interconnected to enable the Internet of Services (IoS). Many of these services are proximity based, such as smart shopping, smart home, smart office, smart health, smart transportation, smart parking, smart grid, and smart city, among other things. Peer-to-peer (P2P) communications may need to be considered in an IoT environment. Examples of P2P communication use include:

Connection—Social Networking (SN) and Internet of Things (IoT): pair or group connections, statuses updates, keep alive, etc.

Advertisement: broadcast, group-cast, or unicast—personalized advertising, etc.

User Centric Activities at Proximity: pair or group based gaming, streaming, content exchanging, etc.

Smart Environment: home/office device control—auto configuration, synchronization, update, etc.

Health: peer monitoring and assistance, medical and hospital services, etc.

Security and Safety: hazard alarms, emergency alarms, police or public safety services, etc.

Smart Transportation: congestion, accident or event notification; interactive transportation management—car pooling, train scheduling, traffic control, airplane ticket updates, etc.

Network of Network: multi-hop to infrastructure; offloading from infrastructure; up loading to hot spot, etc.

Peer-to-peer (P2P) communication, as further described herein, may be centralized with a central controller for the infrastructure-based or fully distributed system without a central controller for the infrastructure-less. Example of P2P devices may include a tablet, smart phone, music player, game console, personal digital assistance, laptop, personal computer (PC), medical device, connected car, smart meter, home gateway, monitor, alarm, set-top box, or printer, among other things. Some standards have identified P2P communication use inside their standardization scope. For example, IEEE 802.15.8 aims to specify PHY and MAC protocols for fully distributed peer-aware communications to support services such as social networking, advertising, gaming, streaming, and emergency services.

IEEE 802.15.8 features, as discussed in IEEE 802.15 Peer Aware Communications (PAC) Study Group (SG) 5 Criteria, may include discovery for peer information without association. A typical discovery signaling rate may be greater than 100 kbps and the number of devices in the discovery may be more than 100 devices. PAC may also scalable data transmission rates (e.g., 10 Mbps), group communications with simultaneous membership in multiple groups (e.g., up to 10), relative positioning, multi-hop relay and security. PAC may be operational in selected globally available unlicensed/licensed bands below 11 GHz capable of supporting certain requirements.

In P2P communication, there may be different frame structures used based on the implementation. For example, IEEE 802 has the following types of frame structures. FIG. 1 illustrates the alternation between the contention free period (CFP) and contention period (CP) in IEEE 802.11 and 802.15 systems, which starts with a beacon 101, followed by CP 102 and CFP 103. Point coordination function (PCF) is used during CFP 103, and distributed coordination function (DCF) is used during CP 102.

FIG. 2 illustrates an example of a general superframe structure in IEEE 802.15.4. The general superframe in IEEE 802.15.4 consists of contention period and contention free period. Contention free period is pre-allocated to specific users. The allocation is determined within CAP 105. The general superframe in 802.15.4 consists of contention period 105 and contention free period 106. Table 1 summarizes a set of frame structures defined in IEEE 802.15.4 standard family.

TABLE 1

Frame Structures Defined in 802.15.4 Standard Family

| Frame Structure | Standard |
| --- | --- |
| General Superframe shown in FIG. 2 | 802.15.4-2011 |
| LLDN (Low Latency Deterministic Network) Superframe shown in FIG. 3 | 802.15.4e-2011 (IEEE 802.15.4e, Draft IEEE P802_15_4e-D8.0) |
| DSME (Deterministic and Synchronous Multi-channel Extension) Multi-superframe shown in FIG. 4 | 802.15.4e-2011 (IEEE 802.15.4e, Draft IEEE P802_15_4e-D8.0) |
| TMCTP Superframe (TVWS multichannel cluster tree PAN) shown in FIG. 5 | 802.15.4m-2013 (IEEE 802.15.4m/D0-2013, PHY/MAC Amendment for TV White Space Between 54 MHz and 862 MHz Physical Layer) |

SUMMARY

Disclosed are designs of frame structures and allocations of channels that support multi-hop for fully distributed and infrastructure-less peer-to-peer communications in proximity. Frame structures may be designed and channels may be allocated in a manner to support multi-hop for fully distributed and infrastructure-less peer-to-peer communications in proximity. In an example, a frame structure may have a dedicated multi-hop period at the end of a superframe. In another example, a frame structure provides for a dedicated multi-hop period at the end of the corresponding frame within a superframe.

Multi-hop channel allocation (CA) procedures are discussed for virtually centralized control and distributed control. In addition, parameters are introduced that extend MAC frames to support the multi-hop peer-to-peer communications. Furthermore, types of media access control management frames are introduced to support multi-hop channel allocation procedures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Disclosed herein are designs of frame structures and allocations of channels that support multi-hop for fully distributed and infrastructure-less peer-to-peer (P2P) communications in proximity. For multi-hop context aware P2P communication in proximity, the following, among other things, are disclosed: 1) Frame structures to enable the multi-hop peer-to-peer communication in proximity by dividing the channel resource for different applications and different hops; 2) Multi-hop channel allocation (CA) procedures; 3) Parameters to extend MAC frames to support multi-hop peer-to-peer communications; and 4) MAC management frame types that support multi-hop channel allocation procedures. The next few paragraphs provide additional context.

Supporting multi-hop communication at the media access control (MAC) layer is needed for fully distributed and infrastructure-less P2P communications. Without infrastructure, Internet protocol (IP) routing may not be available and hopping at MAC is an alternative approach to extend P2P communications. However, multi-hop at MAC for fully distributed and infrastructure-less P2P communications has not been addressed or supported.

For example, in 802.11 and 802.15 standards, there is no frame structure to fully support multi-hop at MAC, especially for distributed and infrastructure-less P2P networks. The frame structures support only one-hop communication. The frame structures do not consider context information for constructing and maintaining the superframe. In addition, a P2P network is formed by desired application, while current frame structures do not consider the context information in network formation. Therefore, the applications contend for the same channel resource. In current frame structures for both single hop and multi-hop communication with various applications, channel usage is low due to a large amount of contentions and collisions among different applications and among different hops.

Most channel allocation schemes in existing IEEE 802.11 and IEEE 802.15 standards mainly focus on how to allocate the channel resource for single hop communication, and some channel allocation schemes which could be extended to multi-hop communication rely on the presence of a centralized controller. The manner of allocating a channel resource is not addressed for multi-hop communication in and among fully distributed and infrastructure-less (e.g., no central controller) P2P networks.

Figure 1:
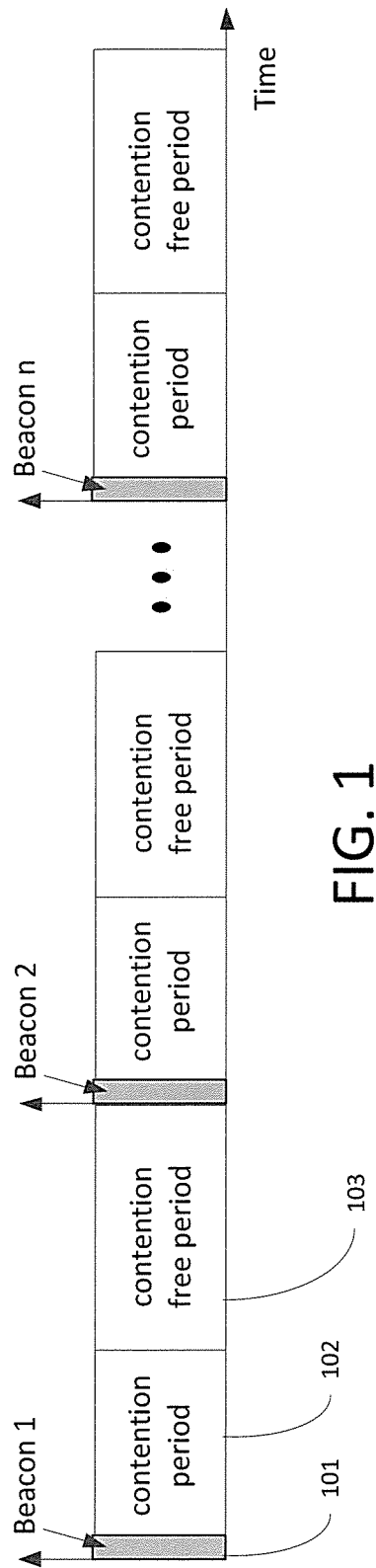
FIG. 1 illustrates the alternation between the contention free period (CFP) and contention period (CP) in classic IEEE 802.11 and 802.15 systems.
Figure 2:
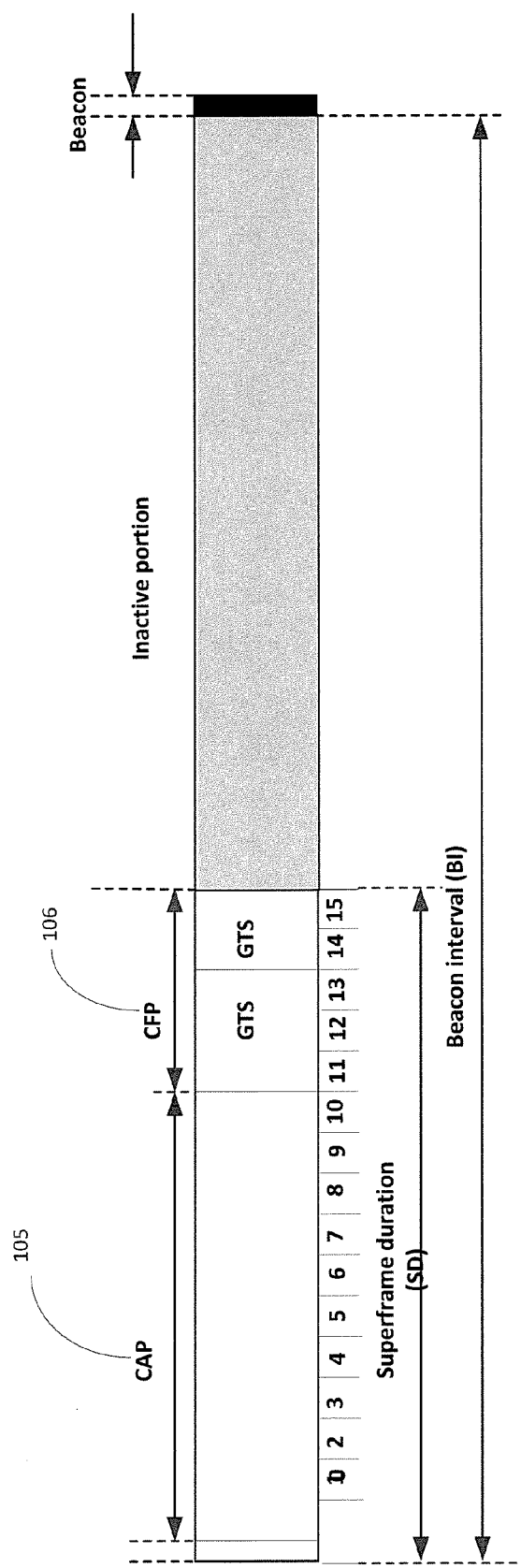
FIG. 2 illustrates an example of general superframe structure in 802.15.4.
Figure 3:
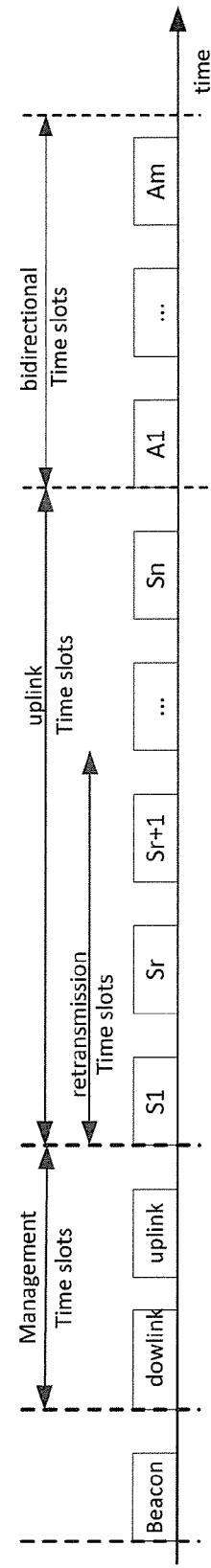
FIG. 3 illustrates low latency deterministic network (LLDN) superframe structure in 802.15.4e.
Figure 4:
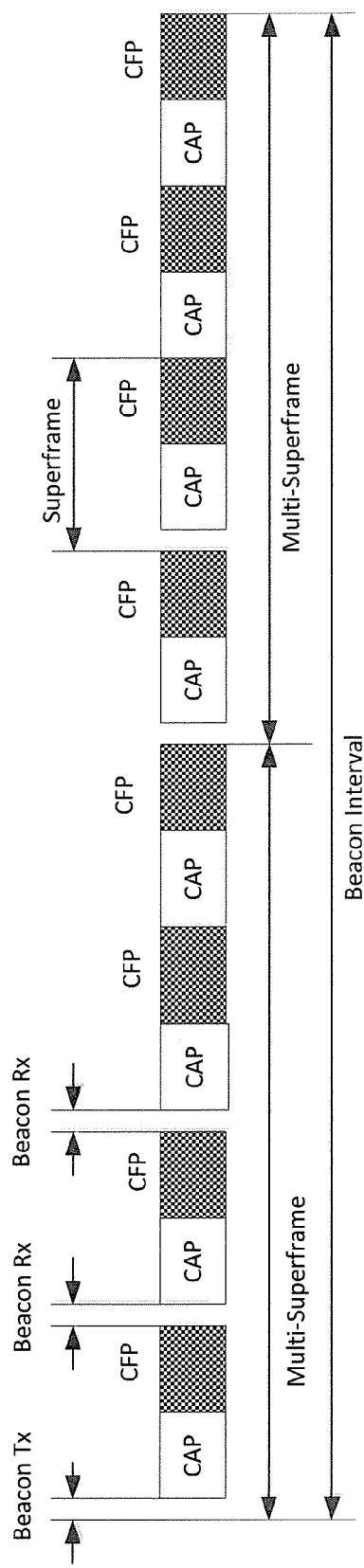
FIG. 4 illustrates deterministic and synchronous multi-channel extension (DSME) multi-superframe structure in 802.15.4e.
Figure 5:
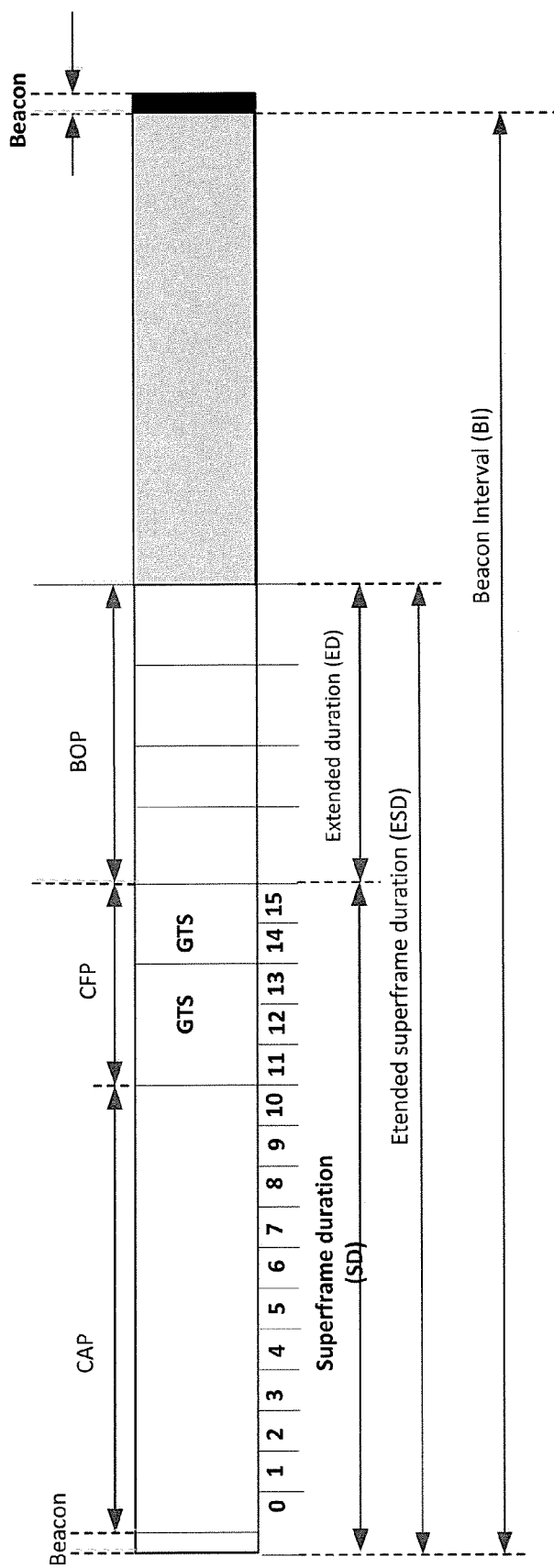
FIG. 5 illustrates television white space (TVWS) multi-channel cluster tree personal area network (PAN) (TMCTP) superframe structure in 802.15.4m.
Figure 6:
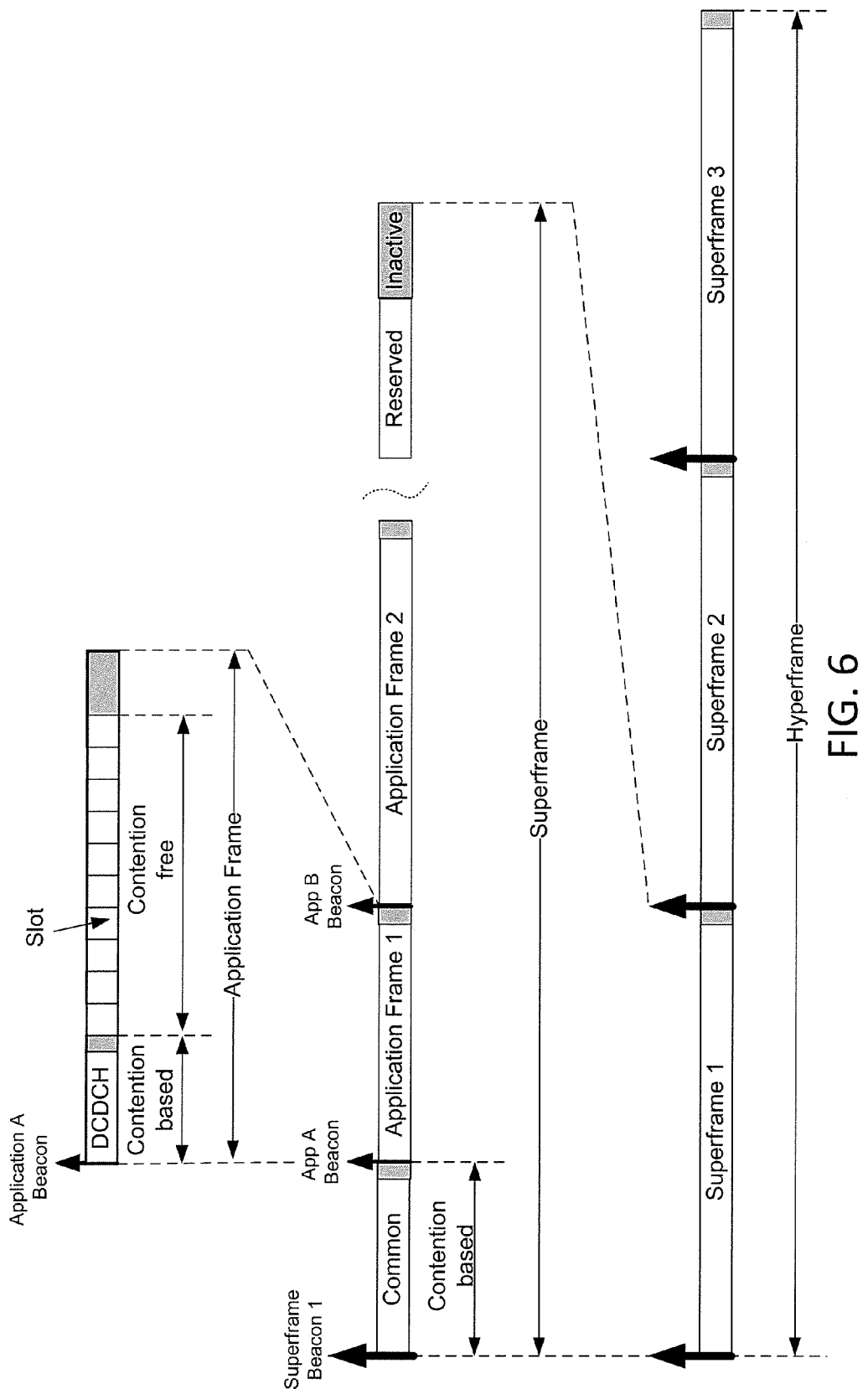
FIG. 6 illustrates general hierarchical frame structure proposed for IEEE 802.15.8.

FIG. 6 illustrates the concept of context-awareness in a hierarchical frame structure for IEEE 802.15.8. Each application formulates a dedicated application frame, and shares the common period for communication between applications, i.e., inter-P2P communication. Context may mean special situation information such as service, application, power, etc.

Figure 7:
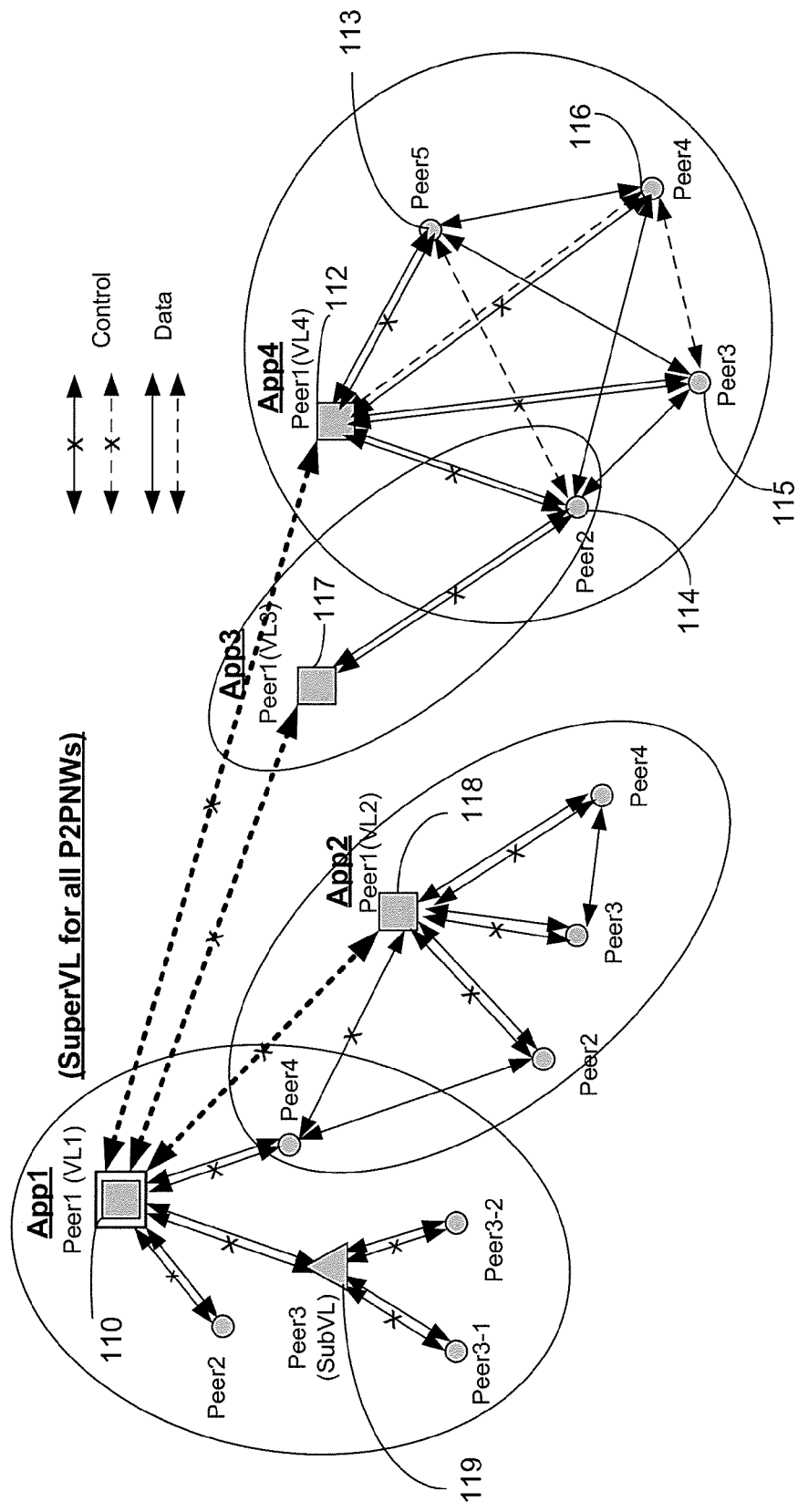
FIG. 7 illustrates virtually centralized Inter-peer-to-peer networks (P2PNWs) Control and Intra-P2PNW Control.

FIG. 7 illustrates a virtually centralized control scheme for P2P communications in proximity Peers (e.g., peer 110) may be a user or device, or a group of users or devices sharing a group ID (e.g., an MS in 2G, a UE in 3G, or a group of FFDs or RFDs in IEEE 802.15 (WPAN)). As discussed in more detail herein, in a multi-hop scenario, a peer may be a hop peer or an end peer. A virtual leader (e.g., peer 112) is a peer defined to represent, manage, and coordinate the P2P communications among a group of peers (e.g., peer 113, peer, 114, peer 115, and peer 116) sharing the same context-based service or application, e.g., within a P2PNW, for virtually centralized intra-P2PNW control. A virtual leader may be dynamically determined and/or changed within the group (P2PNW).

A virtual leader performs functions for the group (P2PNW) such as context management, context-aware discovery broadcast, context-aware peer association, group membership management, synchronization, link management, channel allocation and accessing control, reliable data transmission, routing management, power control and interference management, and channel measurement coordination, etc. A peer is usually the virtual leader for one application (P2PNW), and one application (P2PNW) usually has one virtual leader. Other alternative terms for virtual leader include group leader, header, controller, coordinator, master, or manager, among other terms.

A super virtual leader (e.g., peer 110) is a virtual leader defined to coordinate all virtual leaders (e.g., peer 112, peer 117, and peer 118) of P2PNWs in proximity for virtually centralized inter-P2PNWs control, for the purposes of synchronization, power control, interference management, channel allocation and accessing control, etc. A super virtual leader may be dynamically determined and/or changed among the virtual leaders in proximity. The super virtual leader is the top leader of the virtual leaders' hierarchical structure for virtually centralized inter-P2PNWs control.

Figure 8:
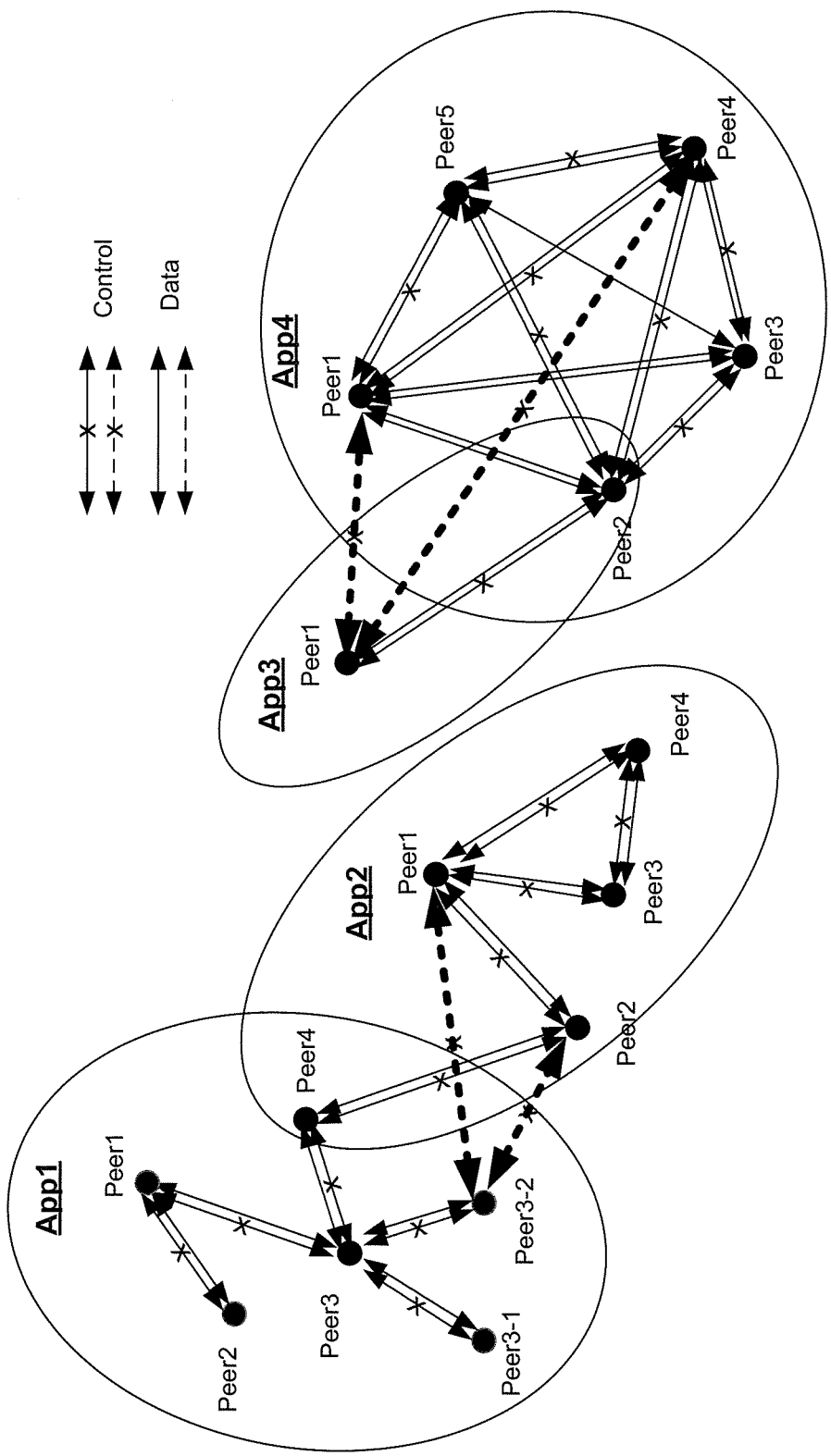
FIG. 8 illustrates distributed Inter-P2PNWs control and intra-P2PNW control.

A sub-virtual leader (e.g., peer 119) is a hop peer defined to extend coverage through multi-hop based on the physical or logical topology for virtually centralized intra-P2PNW control. The roles of a sub-virtual leader include: 1) a virtual leader to manage a subgroup of peers with the same context-based service or application (P2PNW); and 2) as a peer (e.g., a member) under the management of the virtual leader and/or a sub-virtual leader of the same group (P2PNW). The sub-virtual leader may perform a subset of functions of the virtual leader. In this disclosure, SubVL may be considered as a hopper in the context of virtually centralized control. FIG. 8 shows a distributed control scheme for P2P communications in proximity.

Figure 9:
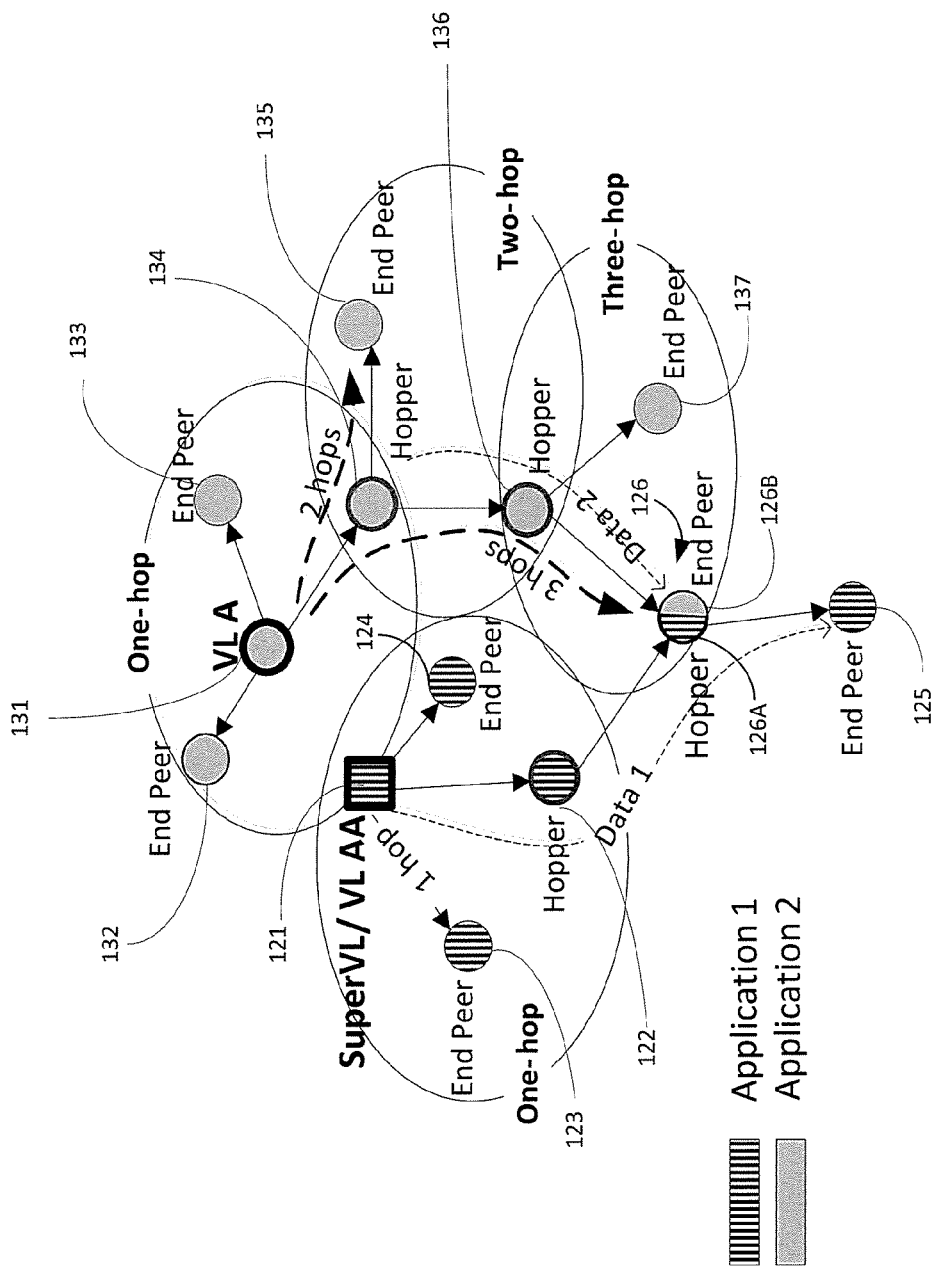
FIG. 9 illustrates a multi-hop topology example with two applications.

Peer-to-peer (P2P) communication may be based on the proximity of peers for desired services in an infrastructure-based or infrastructure-less wireless communication system. Since a P2P network may be formed in proximity by a desired application, techniques are disclosed that divide the channel resource in a superframe for different applications and for different hops to reduce the potential collision and contention. FIG. 9 illustrates a multi-hop topology example with 2 applications, where peer 121 is the virtual leader (VL), of Application 1 and also the SuperVL defining the Superframe. Peer 131 is the VL of Application 2. In this use case, VL 121 (e.g., peer 121) has 2-hop away hopper 126A for Application 1 and VL 131 (e.g., peer 131) has 3-hop away end peer 126B for Application 2, where hopper 126A and Peer end peer 126B are on the same peer (e.g., peer 126) participating in Application 1 and Application 2 simultaneously. In the context of multi-hop, a hopper (e.g., hopper 122) is a peer that relays or hops a message/messages or data to the other peers in proximity to extend the radio coverage. The terms "hop peer" and "hopper" are interchangeable in this disclosure. In the context of multi-hop, an end peer (e.g., end peer 133) is a peer that may not relay or hop any message or data to the other peers in proximity.

For Application 2, VL 131 communicates with hopper 134, end peer 133, and end peer 132 within one-hop. For Application 2, VL 131 communicates with hopper 136 and end peer 135 within 2-hops via hopper 134, while hopper 134, hopper 136, and end peer 135 may also communicate with each other directly (i.e., one-hop). For Application 2, VL 131 communicates with end Peer 126B and End Peer 137 within 3-hop via hopper 136, while hopper 136, end peer 126B and end peer 137 may communicate with each other directly (i.e., one-hop).

For Application 1, VL 121 communicates with hopper 122, end peer 124, and end peer 123 within one-hop. For Application 1, VL 121 communicates with hopper 126A within 2-hops via hopper 122, while hopper 122 and hopper 126A may also communicate with each other directly (i.e., one-hop). For Application 1, VL 121 communicates with end peer 125 within 3-hop via hopper 126A, while hopper 126A and end peer 125 may communicate with each other directly (i.e., one-hop). The use of terms SuperVL and VL in FIG. 9 are based on the virtually centralized control. However the disclosed frame structure is not dependent on the control schemes and may be used in virtually centralized control schemes (e.g., FIG. 7) or distributed control schemes (e.g., FIG. 8). The control scheme is used herein for illustration purposes for the disclosed frame structures.

Figure 10:
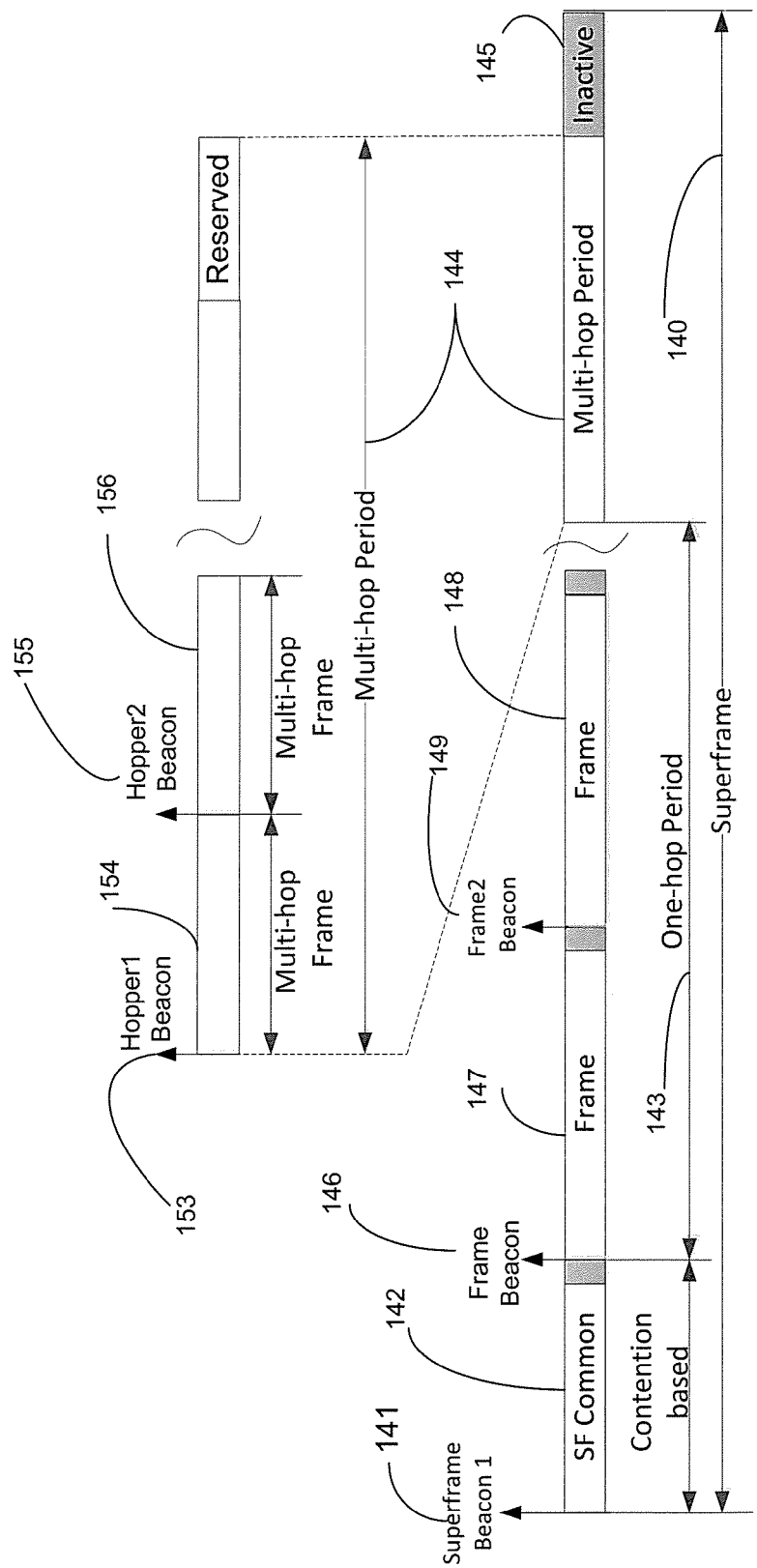
FIG. 10 illustrates frame structure for multi-hop communications.

FIG. 10 shows a first frame structure for multi-hop P2P communications in proximity, where Superframe 140 may include a Superframe (SF) beacon 141, SF common period 142, one-hop period 143, a multi-hop period 144, and an inactive period 145. SF beacon 141 indicates the start of SF 140. SF common period 142 may be after SF beacon for inter-P2P communications. One-hop period 143 may include a frame or frames, which may be allocated to the same application or different applications (e.g., Frame 147 is for Application 1 and Frame 148 is for Application 2 for supporting multi-application frame structure) for one-hop P2P communications from VL(s) of P2P networks (P2PNW) (e.g., VL 131, hopper 134, end peer 133, and end peer 132 for Application 2). Multi-hop period 144 may be dedicated for multi-hop P2P communications from the VL(s) of P2PNW(s). For example, hopper 134 may relay the packets from VL 131 to hopper 136 and end peer 135 as well as the direct (e.g., one-hop) communications among hopper 134, hopper 136 and end peer 135. Hopper 136 relays the 3-hop packets originated from VL 131 to end peer 126B and end peer 137, as well as the direct (e.g., one-hop) communications among hopper 136, end peer 126 and end peer 137. Inactive period 145 may be reserved for future allocation.

The frame structure of FIG. 10 has several features. As discussed in more detail in association with the flow diagrams herein, a peer (e.g., VL 121—Super VL) sending SF beacon 141 may determine the allocation of frames in one-hop period 143 and allocation of multi-hop frames in multi-hop period 144 during SF common period 142 based on the requests from other peers. Each frame in one-hop period 143 starts with a frame beacon (e.g., frame beacon 146 for frame 147) and the frame beacon sender (e.g., any peer, hopper, VL, etc.) owns and manages the frame (e.g., it determines the resource allocation inside the frame). For virtually centralized control, VL will send out the frame beacon to start a frame. Once a peer comes into proximity for an application, it first looks for the SF beacon or a frame for the application by listening to the channel. For distributed control, any peer may send frame beacon if the peer successfully gets a resource allocated for its application during SF common period. The allocation of frames in one-hop period 143 is not impacted when the SF 140 is not required to extend due to the insertion of multi-hop period 144. For example, SF 140 may already be of sufficient length and have available slots for multi-hop frames. If multi-hop period 144 is already in SF 140 and requires the extension, the reserved period at the end of multi-hop period 144 and inactive period 145 at the end of SF 140 may be used without extending SF 140. In this case, SF 140 is not required to extend due to the insertion of multi-hop period. 144. In addition, the allocation inside frame 147 and frame 148 is not impacted.

When the insertion of multi-hop period 144 requires the extension of the SF 140 (e.g., the channel resource is not enough in SF 140 for multi-hop communications), the new starting time of frames in one-hop period 143 shifts in the newly extended SF 140. In this scenario, SF 140 cycle is changed, and the radio resource allocation for each frame in one-hop period 143 is changed as well. The information (e.g., length) of the multi-hop period 144 is indicated in SF beacon 141. SF 140 length carried in SF beacon 141 indicates the current usage of channel resource. The next SF (not shown) will start following the length in the next SF beacon. Each SF beacon indicates the length of each SF following each SF beacon. For example, SF beacon 141 indicates the length of SF 140, and SF 140 is determined to extend during SF 140. Therefore a next superframe beacon (not shown) will indicate the new length effective from the next superframe (not shown).

Additional features for the frame structure of FIG. 10 include the one-hop period 143 being reserved for communication among the sender of the frame beacon (e.g., frame beacon 149) and the peer(s) that could receive frame beacon 149. If either the sender or the receiver in a communication is outside the communication range of sender of frame beacon 149, the transmission occurs in the multi-hop period (e.g., multi-hop period 144). For example, hopper 134 may receive frame beacon 149 from VL 131 for Application 2. Therefore, hopper 134 may communicate with VL 131 in one-hop period 143, since hopper 136 cannot hear VL 131, which manages the frame in one-hop period 143 for Application 2, Hopper 134 may communicate with hopper 136 in Application 2's multi-hop frame (e.g., multi-hop frame 156) in multi-hop period 144.

As shown in FIG. 10, multi-hop period 144 may be split into multiple time periods (e.g., multi-hop frames) each of which is allocated to a hopper for multi-hopping. The start of a multi-hop frame (e.g., multi-hop frame 154 and multi-hop frame 156) in multi-hop period 144 is indicated via a beacon (e.g., hopper beacon 153 and hopper beacon 155) broadcasted by a hopper (e.g., hopper 122 and hopper 134). The hoppers may be for the same application (e.g., hopper 122 and hopper 126A for Application 1) or different applications (e.g., hopper 122 for Application 1 and Hopper 134 for Application 2).

For hopper 134, which is 1-hop away from VL 131 there are multiple methods to process its request, such as the following exemplary processes, in which more detail is given in the flows herein. In a first example process, multi-hop frame 156 already exists in multi-hop period 144 managed by hopper 134 under VL 131 and VL 131 can allocate the channel in the existing multi-hop frame 156 based on the requirement. In this case, VL 131 sends a response with an allocation. In a second example process, there is no multi-hop frame in multi-hop period 144 or the existing multi-hop frame 156 does not have enough channel resource to meet requirements. In this case, VL 131 sends a request to the SuperVL (e.g., VL 121 or SuperVL 121) during the next available SF common period (e.g., SF common 142) to request a new multi-hop frame or the extension of an existing multi-hop frame 156, and SuperVL 121 makes decision for channel allocation. SuperVL 121 is allowed to extend multi-hop period 144 or extend multi-hop frame 156, because length of multi-hop period 144 is defined by SuperVL 121 and each multi-hop frame is created and allocated by SuperVL 121.

For the hopper (e.g., hopper 136) that is out of range of VL 131 (e.g., i-hop away from VL, i>=2), VL 131 sends a request in multi-hop frame 156 to its associated hopper (here, hopper 134) that is (i−1)-hop away from VL 131, and hopper 134 determines the allocation. Inside each multi-hop frame, hopper 134, which owns multi-hop frame 156, defines the structure of multi-hop frame 156. For example hopper 134 may define the length of multi-hop frame 156, length of contention period of multi-hop frame 156, and length of the contention free period of multi-hop frame 156. Hopper 134, which is 1-hop away from VL 131, may request a new multi-hop frame in multi-hop period 144 and define the structure of the new multi-hop frame. Hopper 136, which is 2-hop away from VL 131, may receive channel resources in the multi-hop frame from its hopper (e.g. hopper 134) and hopper 134 may define the structure of resource allocated to hopper 136. In general, each hopper may be responsible for configuring the frame it owns by sending via a hopper beacon.

Figure 11:
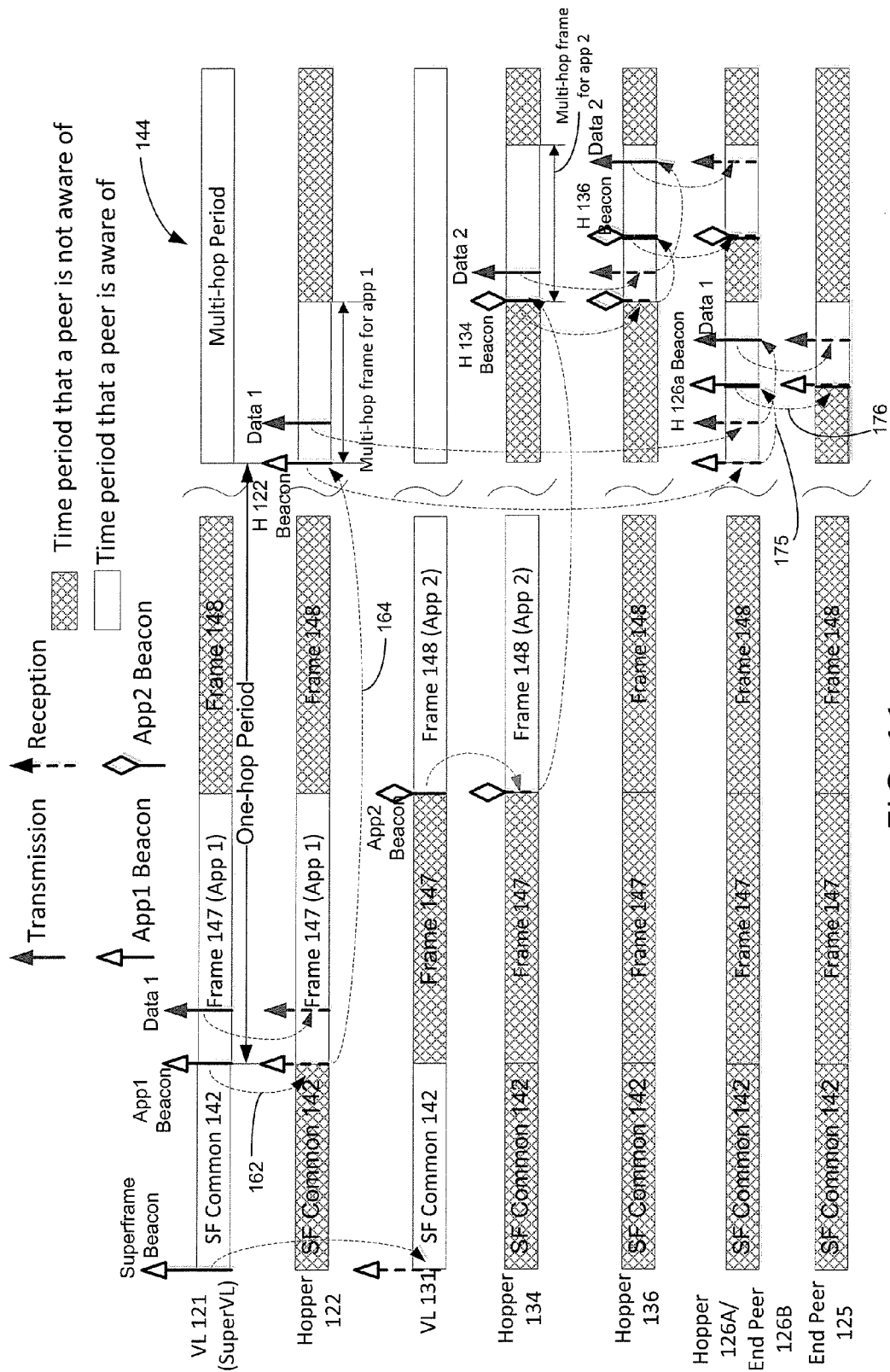
FIG. 11 illustrates frame structure for multi-hop peer-to-peer communications based on topology shown in FIG. 9.

FIG. 11 illustrates an example of frame structure of FIG. 10 for multi-hop peer-to-peer communications based on topology shown in FIG. 9. Each frame in one-hop period is allocated to an application; therefore, there is no contention between applications except SF common period 142 at beginning of SF 140. As discussed before, one-hop period (e.g., one-hop period 143) is defined for the communication between VL (e.g., VL 121 and VL 131) and its one-hop neighbor (e.g., end peer 123 for VL 121 and end peer 133 for VL 131). For example, the communication between VL 121 and hopper 122 (or end peer 123/end peer 124) for Application 1 takes place in frame 1, which is within one hop period 143. This is because hopper 122, end peer 123, and end peer 124 are all located within one hop range of VL 121. The aforementioned applies similarly to Application 2 with regard to frame 148.

Other communications (e.g., hopper 122, hopper 126A, and end peer 125) within Application 1 network (e.g., Application 1 nodes shown in FIG. 9) will happen in the multi-hop period, since hopper 126A and end peer 125 are not located in one-hop range of VL 121, which initiates and forms the network of Application 1. Because hopper 126A and end peer 125 are not in one-hop range, communication with them regarding Application 1 will take place in multi-hop period.

For example at line 162 in FIG. 11, VL 121 sends out an application beacon (e.g., frame beacon 146) for Application 1, which indicates the start of frame 147 (e.g., one hop period of Application 1 or App1). Line 162 illustrates the pairing of the transmission of frame beacon 147 at VL 121 and reception of frame beacon 147 at hopper 122. Since hopper 122 is within one-hop range, hopper 122 can receive frame beacon 146, and start communications with VL 121 during the period of frame 147.

With continued reference to FIG. 11, line 164 shows that hopper 122 receives frame beacon 146 from VL 122 and then sends out its hopper beacon (e.g., hopper beacon 153) in multi-hop period 144 to initiate the communication with hopper 126A, which is not aware of frame 147 and may only receive a beacon (e.g., hopper beacon 153) from hopper 122. Hopper 126A may not start communicating about Application 1 until it receives hopper beacon 153 from hopper 122. Hopper 126A may have no idea where to send or receive packets before receiving the beacon from Hopper 122. In an example, line 164 indicates a communication where there is a transmission of hopper beacon 153 by hopper 122 and reception of the hopper beacon 153 by hopper 126A. Again hopper beacon 153 initiates communication in multi-hop period 144.

Similar to the line 164, at line 175 hopper 126A sends its hopper beacon in multi-hop period 144 to end peer 125, so that end peer 125 may start communication for Application 1. Line 176 indicates communication of the pair of transmission and reception of hopper 126A's beacon.

Peers that are associated with a Hopper may be aware of only part of the multi-hop frame allocated for the application in the multi-hop period. For example, Hopper 126A in Application 1 may receive the hopper beacon from hopper 122; therefore, it is aware of the multi-hop frames allocated to hopper 122 and to itself as a Hopper in Application 1 in multi-hop period 144. But hopper 126A (as end peer 126B in Application 2 or App2) may also receive the beacon from hopper 136 in Application 2, so hopper 126A may be aware of the multi-hop frame allocated to hopper 136 in Application 2 in the multi-hop period 144.

With continued reference to FIG. 11, similar to the examples above for Application 1, the transmission of data 2 from hopper 134 to hopper 136 occurs in the multi-hop period 144, because hopper 136 is 2-hops away from the VL 131, which owns and manages the application 2's frame (e.g., frame 148) in a one-hop period (e.g., one-hop period 143).

Figure 12:
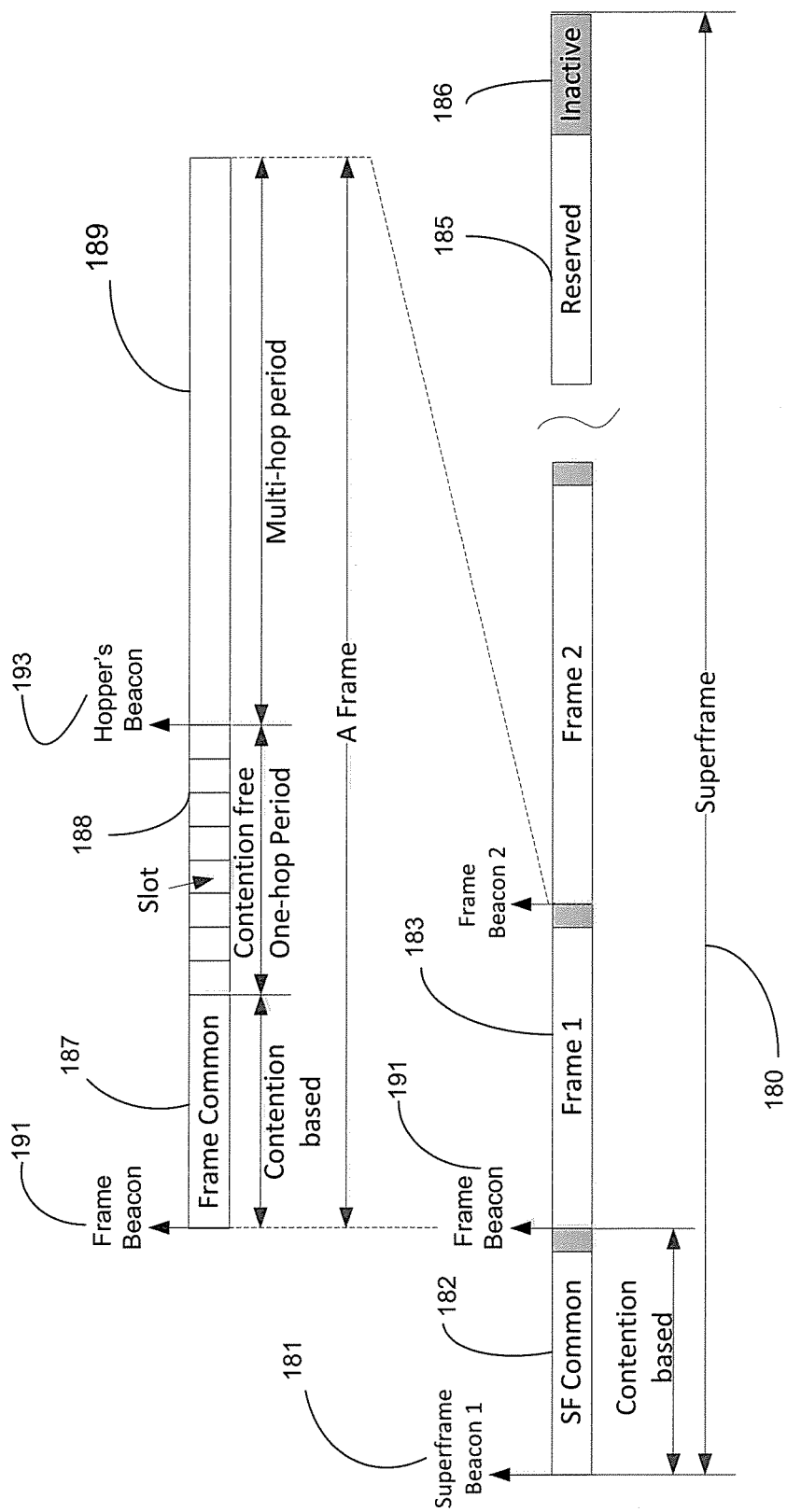
FIG. 12 illustrates frame structure for multi-hop communication.

FIG. 12 shows another frame structure for multi-hop peer-to-peer communications, where SF 180 includes a SF beacon 181, SF common period 182, frames for P2P communications (e.g., frame 183), reserved period 185, and inactive period 186. This frame structure may be suitable for different scenarios, such as a distributed P2P network (e.g., FIG. 8) or VL structures of FIG. 7). SF beacon 181 indicates the start of SF 180. SF common period 182 is after SF beacon 181 and provides for inter-P2P communications. Each frame, such as frame 183, includes frame common period 187, one-hop period 188, and multi-hop period 189. Frame common period 187 is a contention based period that allows peers to be active in the frame. One-hop period 188 may be contention free and be allocated to peers for one-hop communications. Multi-hop period 189 may be reserved to peers for multi-hop communications. An inactive period may be reserved for future allocation.

In the frame structure of FIG. 12, as illustrated, multi-hop period 189 is inserted at the end of each frame. The communications for allocation of multi-hop period 189 may take place in frame common period 187 at the beginning of each frame. The features of FIG. 12 frame structure are discussed below with further detailed flows herein.

In summary, with continued reference to FIG. 12, the peer sending SF beacon 181 determines the allocation of frames in SF 180 during SF common period 182 based on a request for frames from other peers. The peer sending frame beacon 191 determines the allocation of one-hop period 188 and multi-hop period 189 in a frame during frame common period 187. The channel allocation of multi-hop period 189 is moved (when compared to the frame structure shown in FIG. 10) from a SF common period to frame common period in each frame (e.g., at the beginning of a frame). As a result, SF common period 182 for frame allocation at the beginning of SF 180 may not have too much contention compared with the frame structure as illustrated in FIG. 10. Hoppers (e.g. hopper 122 and hopper 134) that can receive frame beacon 191, may send a request in frame common period 187 for a channel in one-hop period 188 to communicate with the sender of frame beacon 191 and send a request in frame common period 187 for channel in multi-hop period 189 to communicate with peers associated with them. The sender of frame beacon 191 makes the allocation decision.

Hoppers (e.g. hopper 126A and Hopper 136) that are not aware of one-hop period 188 (e.g., hopper 136 cannot receive frame beacon 191) in frame 183 may receive hopper beacon 193 in multi-hop period 189 and get channels from their hoppers (e.g., hopper 134 for hopper 136) and communicate with peers associated with them.

The information (e.g., length) of multi-hop period 189 is indicated in frame beacon 191 at the beginning of frame 183. SF length and frame length follow the same rule as the exemplary frame structure of FIG. 10. For those frames that do not need multi-hop communications, there may be no multi-hop period in the frame, and the entire frame could be used for one-hop communication. Frame 183 may be impacted in instances when SF 180 is to be extended (e.g., frame 183 needs to extend with insertion of multi-hop period 189 or a new frame is needed in SF 180), which may lead to a shift of starting times of affected frames. Each frame may independently determine the structure of the multi-hop period (e.g., multi-hop period 189). Inside multi-hop period 189, each hopper (e.g., hopper 134) is responsible to configure the time period (e.g., the length of frame common period 187 and length of one-hop period 188) it owns by sending a hopper beacon (e.g., hopper beacon 193).

Figure 13:
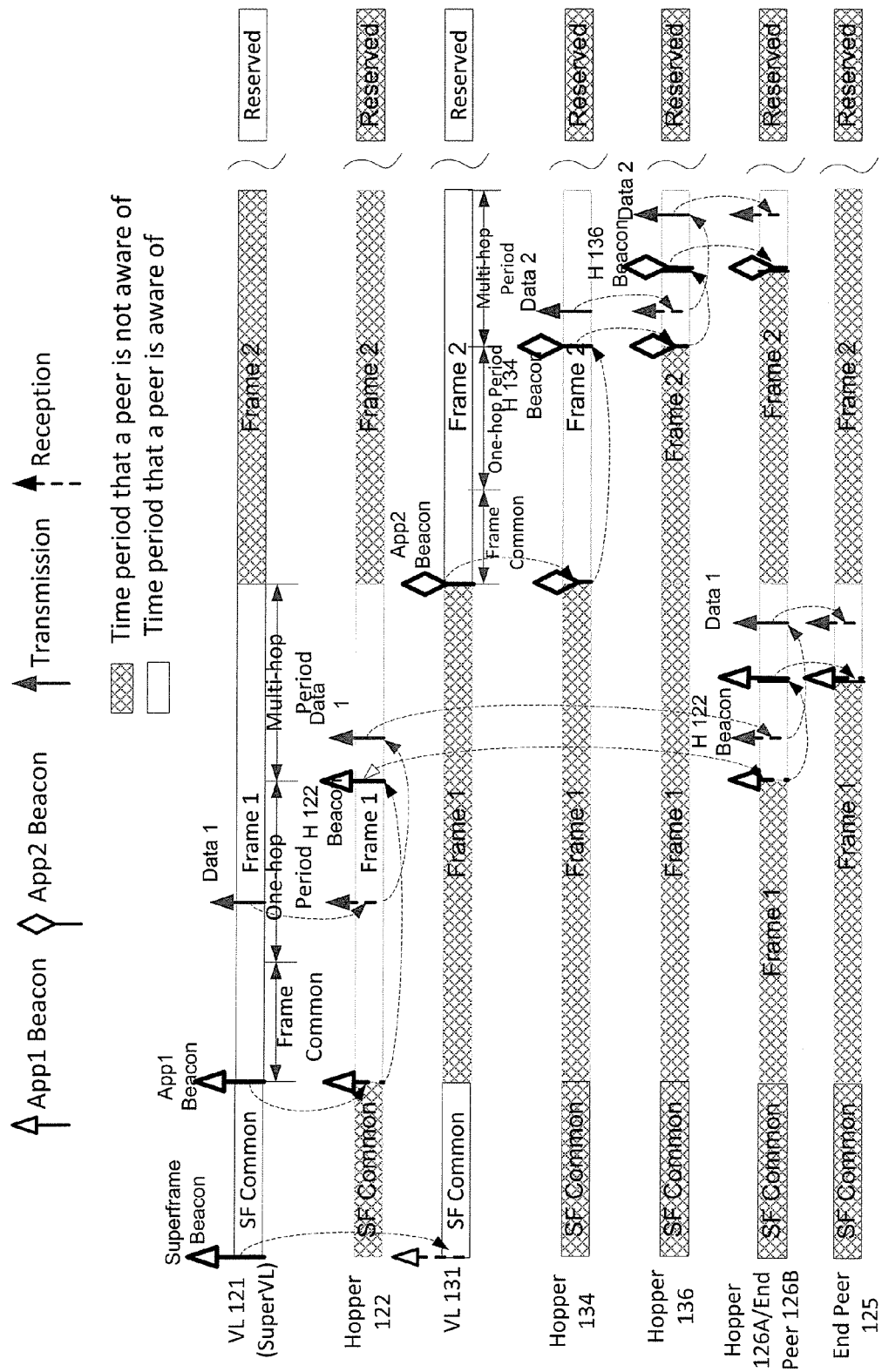
FIG. 13 illustrates an example of a disclosed frame structure.

FIG. 13 illustrates an example of the frame structure of FIG. 12 for multi-hop peer-to-peer communications based on topology in FIG. 9 where each frame is allocated to an application. It is similar to FIG. 11 and the surrounding discussion except the functions happen within a frame. As shown in FIG. 13, both one-hop transmission and multi-hop transmission for an application occur in one frame. The transmission from hopper 134 to hopper 136 is considered as the second hop transmission, and is fulfilled in multi-hop period in Application 2 frame. This is because hopper 136 is 2-hop away from the VL 131, which owns and manages the Application 2 frame.

Below are channel allocation schemes that illustrate how the channel resource may be allocated in the multi-hop period for disclosed frame structures in order to enable the multi-hop communications. Assumptions may include that a first peer already selects a hopper for multi-hop communication and that the first peer already determines that the second peer is a hopper.

Figure 14:
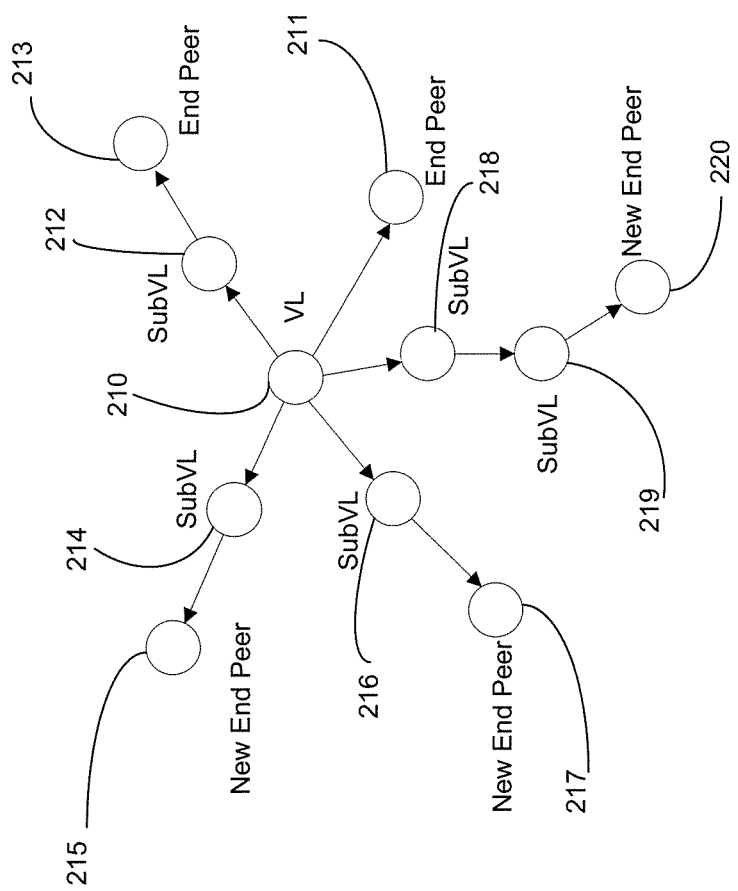
FIG. 14 illustrates example topology for channel allocation.

FIG. 14 assumes a topology that uses a single application (e.g., Application 3). FIG. 14 is used as an example to describe the channel allocation (CA) procedures discussed herein. In an example scenario, considering FIG. 14, VL 210 has already allocated channel resources to SubVL 212 for communication between SubVL 212 and end peer 213. SubVL 214 and SubVL 216 may have just become SubVLs by connecting with new end peer 215 and new end peer 217 respectively. SubVL 214 and SubVL 216 may need channel resources for multi-hop communication. VL 210 has already allocated channel resource for communication between SubVL 218 and SubVL 219 (previously end Peer 219), which just became a SubVL by connecting new end peer 220. Therefore, SubVL 219 may require channel resources to communicate with new end peer 220. The call flows and flow charts introduced with regard to multi-hop CA procedures with virtually centralized control are used as examples for describing the multi-hop CA procedures. Under the virtually centralized control, the terms SubVL and Hopper may be used interchangeably. Hopper is a more general term for a large amount of control schemes.

The multi-hop CA poll message may be used to poll a P2P network or sub-network to determine if any hopper or hoppers request channel resources for multi-hop communication. A VL may broadcast the multi-hop CA poll message to its network (e.g., Application 3). A VL may initiate the multi-hop CA procedure in some circumstances. For example, a VL may periodically broadcast the poll message to trace the channel allocation requirement for more efficient usage of channel resources. In distributed control, a hopper may broadcast poll message in the content based period to its network.

Upon receiving the poll message, a device may have different responses based on the situation. A first response may be to respond to the poll message by sending a multi-hop CA request message. With reference to FIG. 14, in an example, SubVL 214 may receive the poll message from VL 210 and respond back with its multi-hop CA request message. In a second response, there may be a rebroadcast of the poll message. For example, SubVL 218 may receive the poll message from VL 210, and SubVL 218 finds that the multi-hop CA is already done for communication between SubVL 218 and SubVL 219. SubVL 218 may rebroadcast the poll message to the sub-network under its management. In a third response, the poll message may be discarded. For example, end peer 211 may receive the poll message from VL 210 and then discard the poll message. SubVL 214 may receive the poll message from SubVL 212 and it discards the poll message. VL 210 may receive a poll message from SubVL 212 and then discards the poll message.

Figure 21:
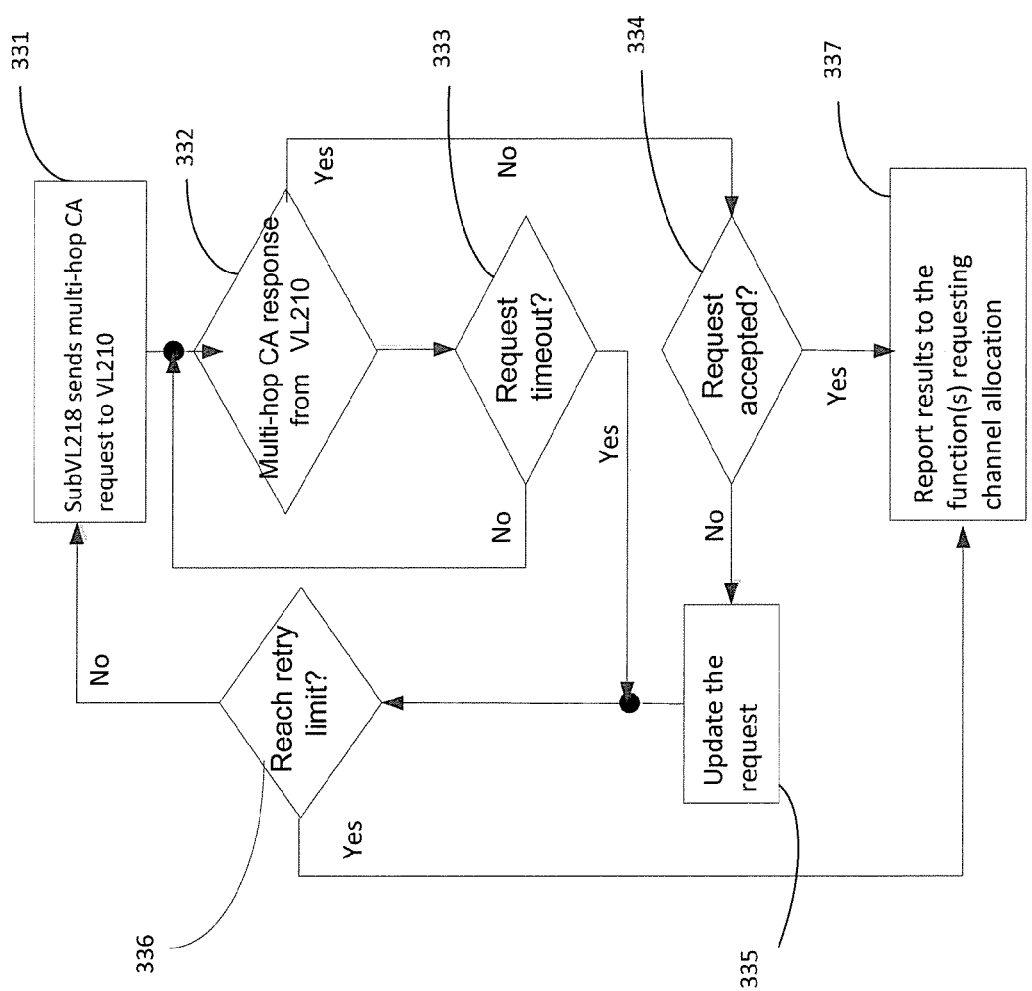
FIG. 21 illustrates operations to send multi-hop CA request at SubVL (Case C)
Figure 22:
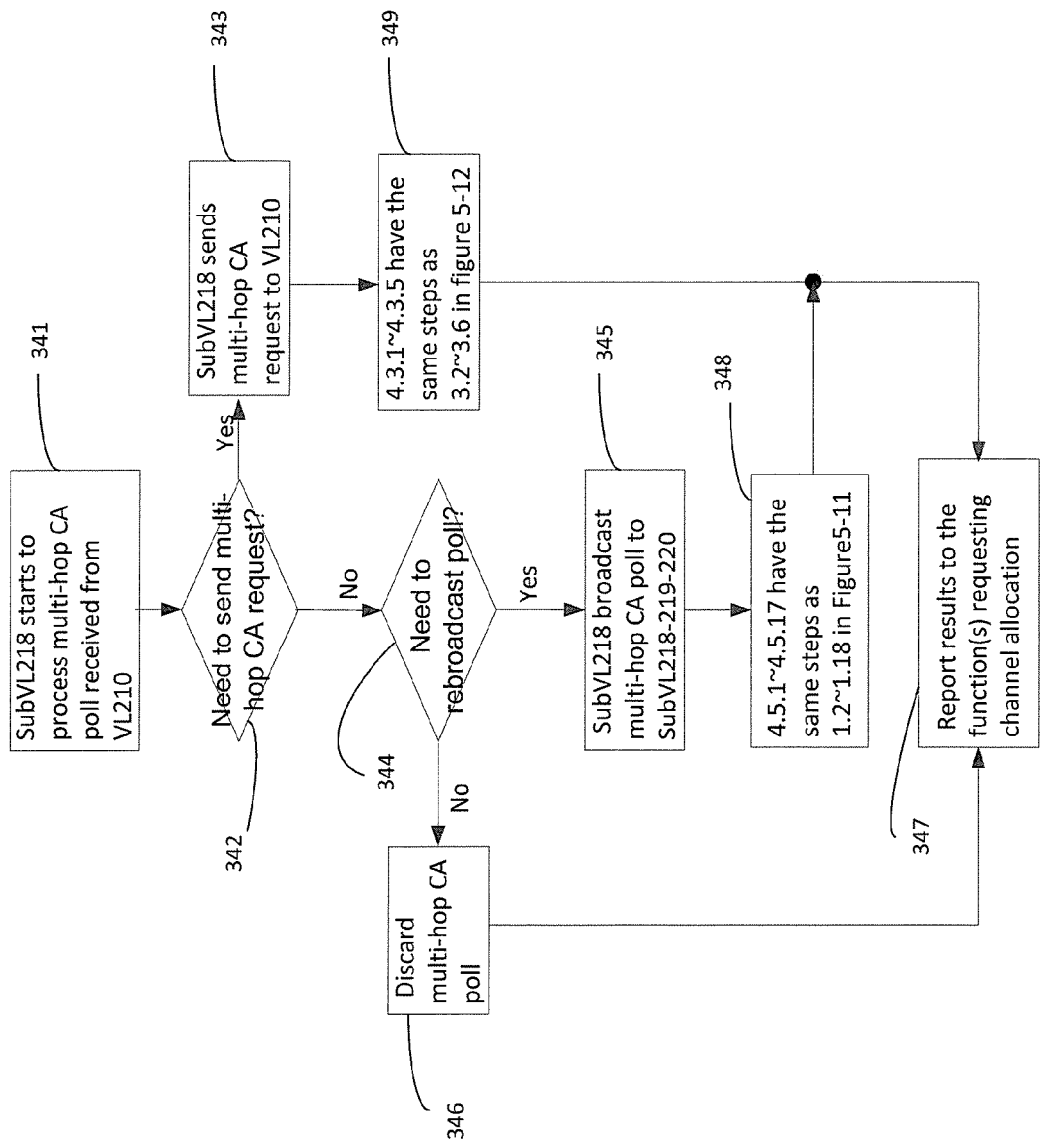
FIG. 22 illustrates operations to receive multi-hop CA poll at SubVL (Case D)
Figure 23A:
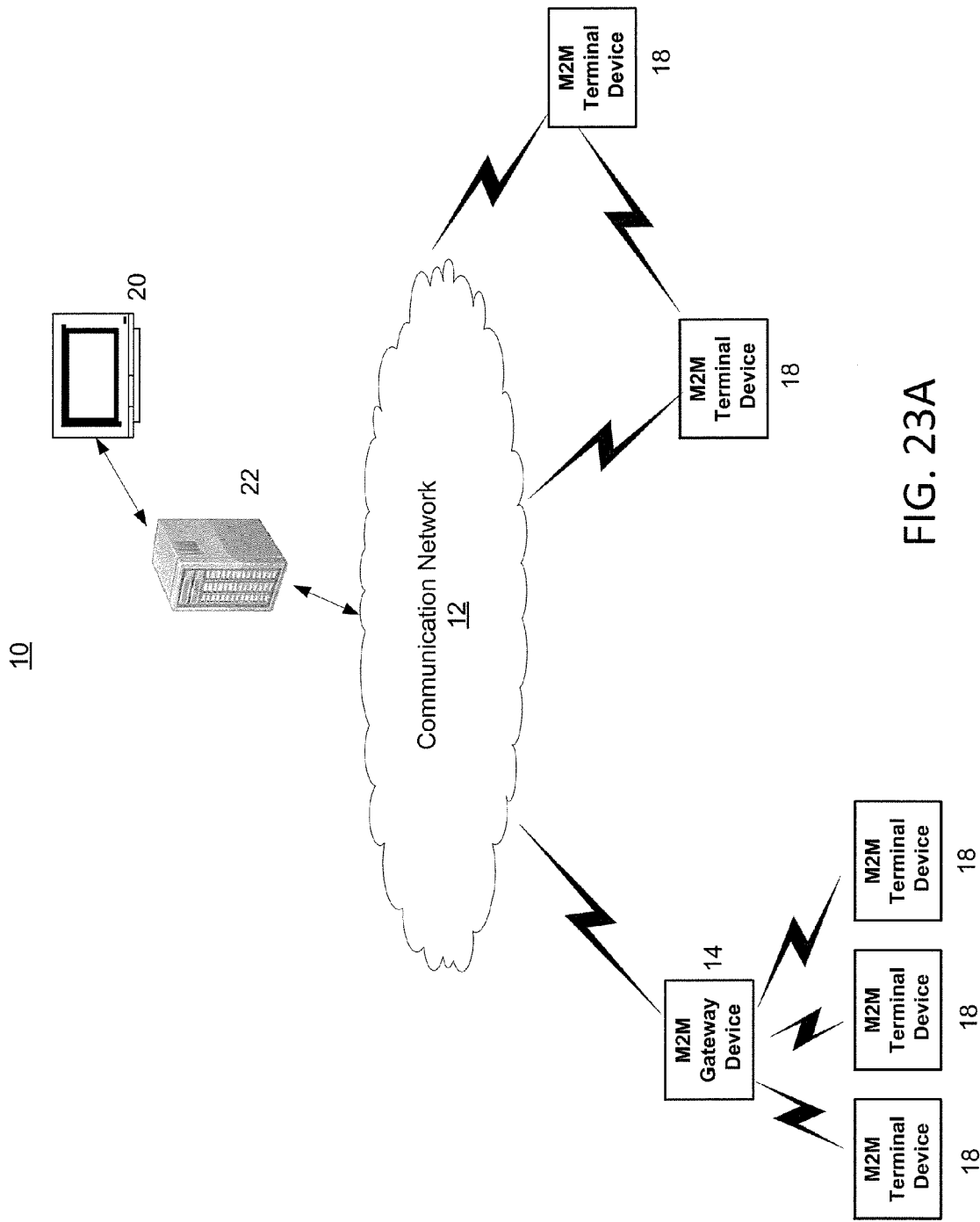
FIG. 23A is a system diagram of an example machine-to-machine (M2M) or Internet of Things (IoT) communication system in which the disclosed subject matter may be implemented.
Figure 23B:
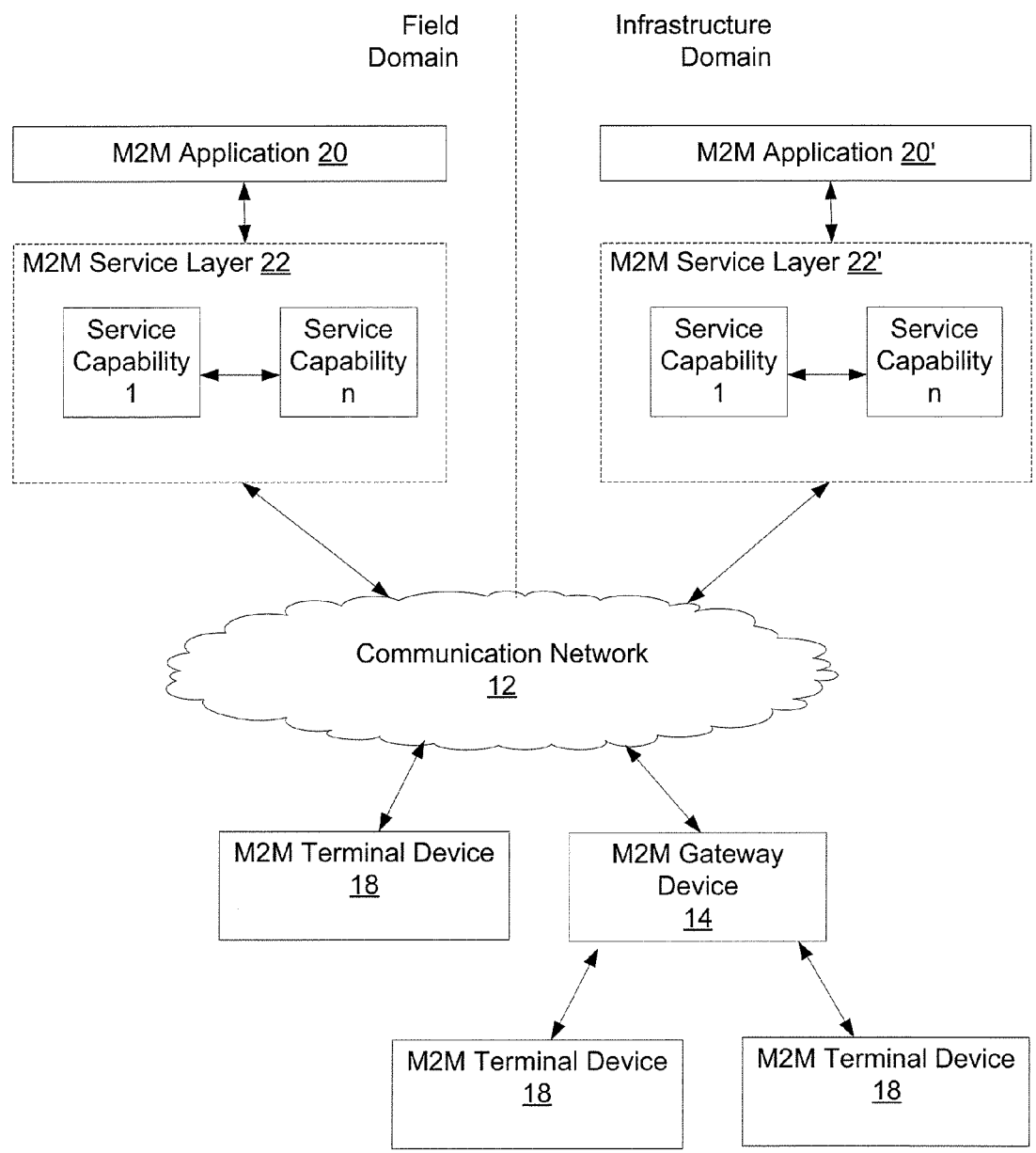
FIG. 23B is a system diagram of an example architecture that may be used within the M2M/IoT communications system illustrated in FIG. 23A.
Figure 23C:
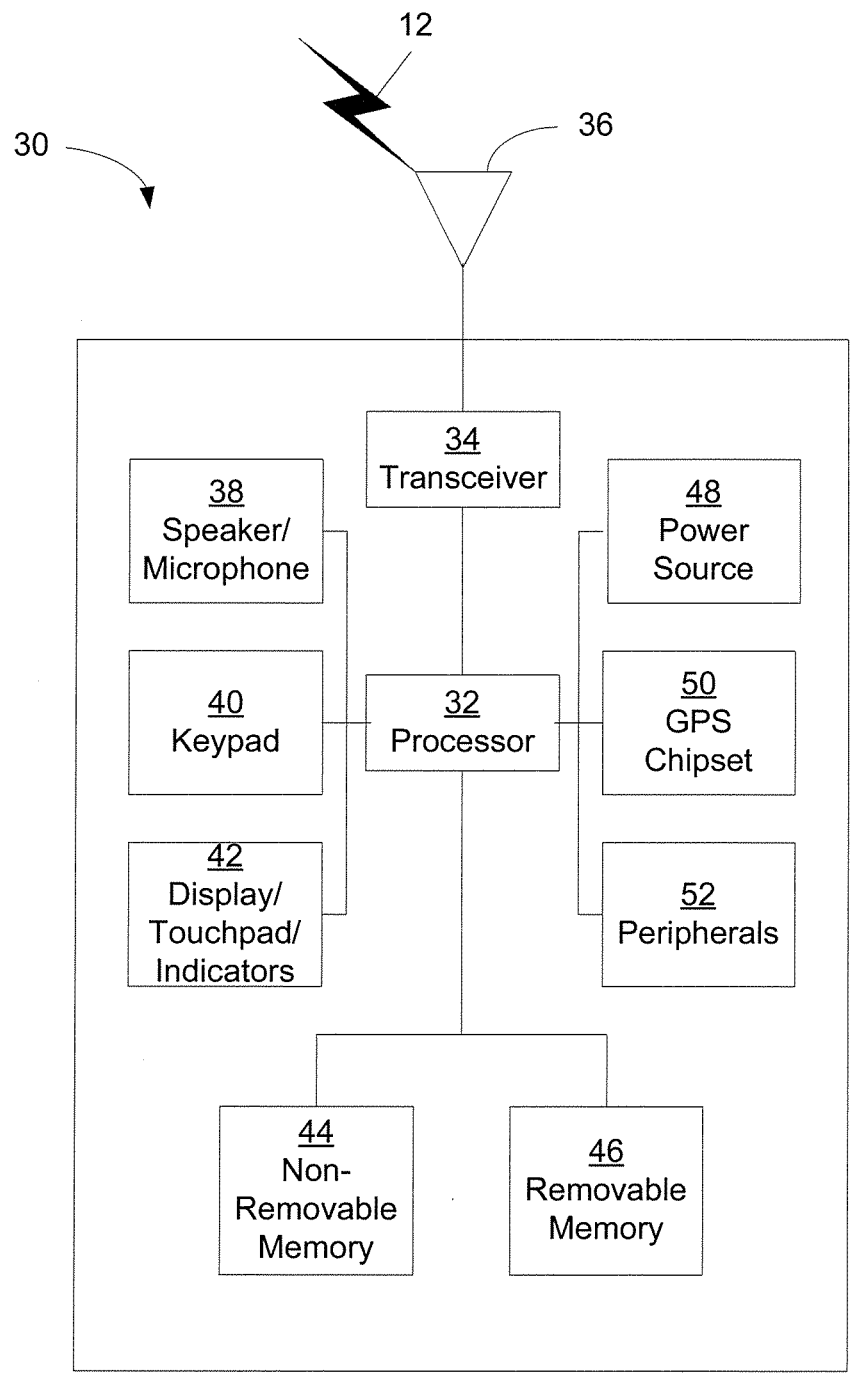
FIG. 23C is a system diagram of an example M2M/IoT terminal or gateway device that may be used within the communications system illustrated in FIG. 23A.
Figure 23D:
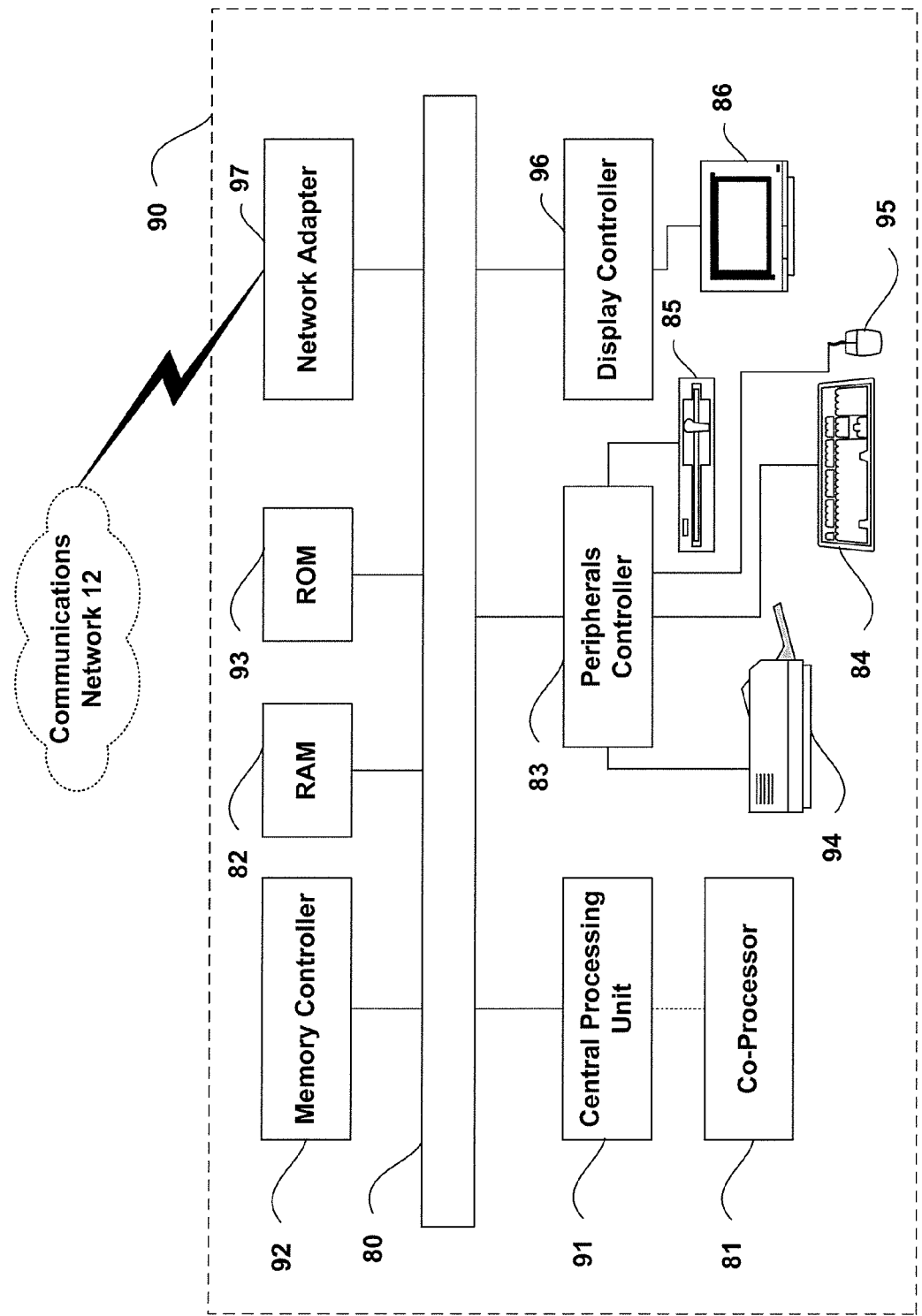
FIG. 23D is a block diagram of an example computing system in which aspects of the communication system of FIG. 23A may be embodied.

It is understood that the entities performing the steps illustrated in the FIGs, such as FIG. 15-FIG. 22 are logical entities or work in conjunction with logical entities that may be implemented in the form of software (e.g., computer-executable instructions) stored in a memory of, and executing on a processor of, a device, server, or computer system such as those illustrated in FIG. 23C or FIG. 23D. That is, the method(s) illustrated in FIG. 15-FIG. 22 may be implemented in the form of software (i.e., computer-executable instructions) stored in a memory of a computing device, such as the device or computer system illustrated in FIG. 23C or FIG. 23D, which computer executable instructions, when executed by a processor of the computing device, perform the steps illustrated in FIG. 15-FIG. 22. In an example, with further detail below with regard to the interaction of machine-to-machine (M2M) devices, VL 210, end peer 211, end peer 213, SubVL 214, SubVL 216, hopper 134, SuperVL 209, of FIG. 16 may reside on M2M terminal device 18 of FIG. 23A.

Figure 15:
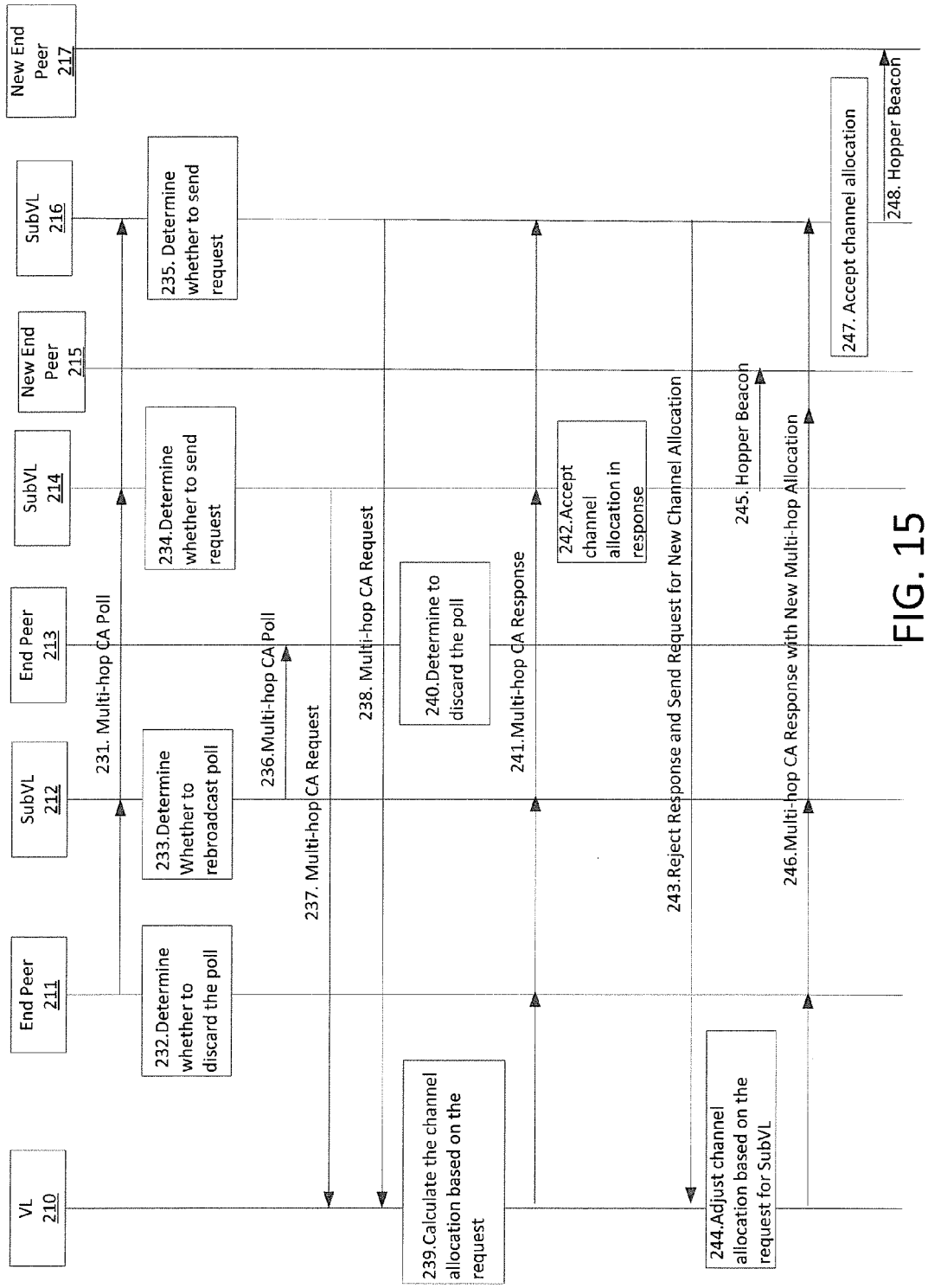
FIG. 15 illustrates procedures initiated at VL by broadcasting multi-hop CA poll message without SuperVL involved.

In the context of FIG. 14, FIG. 15 illustrates an exemplary method for broadcasting a multi-hop CA poll message without a SuperVL involved. This method may be initiated by the VL 210. At step 231, VL 210 may broadcast the multi-hop CA poll message to identify if the multi-hop CA may be needed in the P2P network of FIG. 14. Thereafter peers can receive the poll messages with varying responses. At step 232, end peer 211 discards the poll message. At step, 233 SubVL 212 decides to rebroadcast the poll message to the sub-network under its management. At step 234 and step 235, SubVL 214 and SubVL 216, respectively, decide to send multi-hop CA request to VL 210 for channel resources. At step 236, SubVL 212 may rebroadcast or otherwise send the received poll message of step 231/step 233 to its sub-network. At step 237, SubVL 214 sends a request to VL 210 for channel resources. At step 238, SubVL 216 also sends a request to VL 210 for channel resources. At step 239, VL 210 receives the requests from SubVL 216 and SubVL 214 and calculates the possible channel allocation based on the requests. VL 210 determines that it can satisfy the received requests from SubVL 216 and SubVL 214. Meanwhile, at step 240, end peer 213 receives the poll message from SubVL 212 and discards the poll message.

At step 241, VL 210 sends the multi-hop CA response with the channel allocation. Other peers may need to be updated, particularly when starting times for SF are changed. At step 242, SubVL 214 receives the response and accepts the channel allocation. At step 243, SubVL 216 receives the response, but it does not agree with the channel allocation. SubVL 216 re-sends the request to VL 210 for negotiation. At step 244, VL 210 receives the new request, and recalculates the channel allocation based on the new request from SubVL 216. At step 245, SubVL 214 sends its beacon on the allocated channel to new end peer 215 to start communication. Step 245 illustrates the transmission of hopper beacon as a result of sending a request and getting channel resource at SubVL 214. It is not necessarily related to the new channel allocation procedure. At step 246, VL 210 sends a multi-hop CA response with the new channel allocation to multiple peers including SubVL 216, which initiated the renegotiation of channel allocation. For step 246, it may affect other peers besides SubVL 216. For example, VL 210 gets request in step 243, and adjusts the channel allocation (e.g., switch the slots allocated to SubVL 214 with slots allocated to SubVL 216, or extend multi-hop period for more slots to SubVL 216), this may affect the channel allocation to SubVL 214. At step 247, SubVL 216 accepts CA. At step, SubVL 216 sends its beacon on the allocated channel to new end peer 217 to start the communication.

Figure 16:
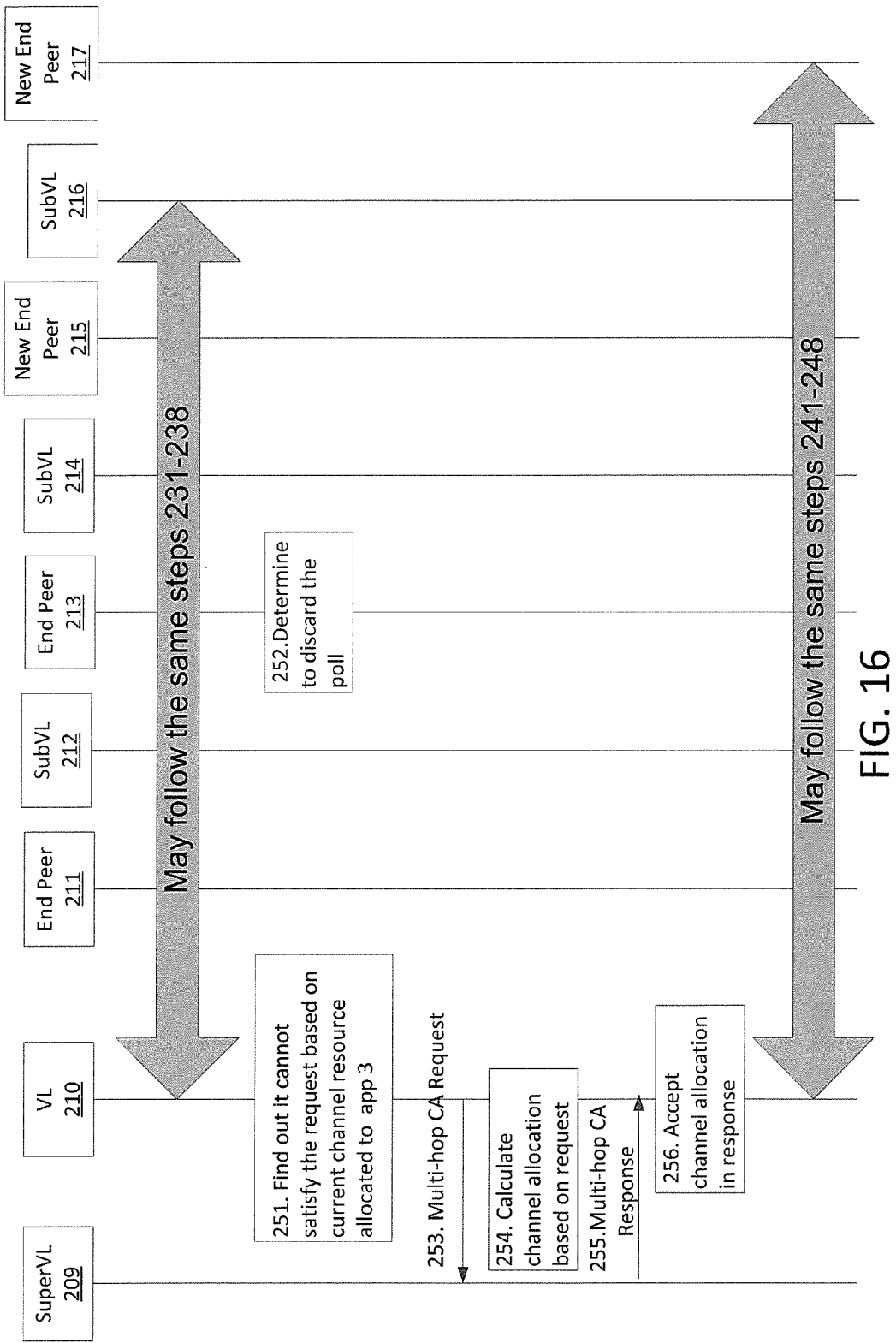
FIG. 16 illustrates procedures initiated at VL by broadcasting multi-hop CA poll message with SuperVL involved.

FIG. 16 illustrates the procedures initiated at VL 210 by broadcasting multi-hop CA poll message with SuperVL 209 involved. SuperVL 209 is not shown in FIG. 14 but operates in similar manner as other SuperVLs as discussed herein (e.g., SuperVL 121). The reason SuperVL 209 may be involved is that VL 210 may not be able to handle the request for channel allocation, so it asks SuperVL 209 for help. It takes following steps in view of the scenario above as illustrated in FIG. 14. Initial steps would follow the step 231 through step 238 in FIG. 15. At step 251 of FIG. 16, VL 210 finds out that it cannot handle the requests from SubVLs it managed. At step 252, end peer 213 decides to discard a received poll message from SubVL 212. At step 253, VL 210 sends a multi-hop CA request to SuperVL 209 for channel resources. At step 254, SuperVL 209 determines a channel allocation based on the request from VL 210. At step 255, SuperVL 209 sends a multi-hop CA response to VL 210; the response includes the determined channel allocation of step 254. At step 256, VL 210 receives the response from SuperVL 209 and accepts the channel allocation in the response. The following steps may be similar to steps 241 thru steps 248 of FIG. 15. There could be multiple rounds of negotiation between VL 210 and SuperVL 209 like steps 253 thru steps 255 in FIG. 16, if VL 210 does not accept the channel allocation received from SuperVL 209.

Figure 17:
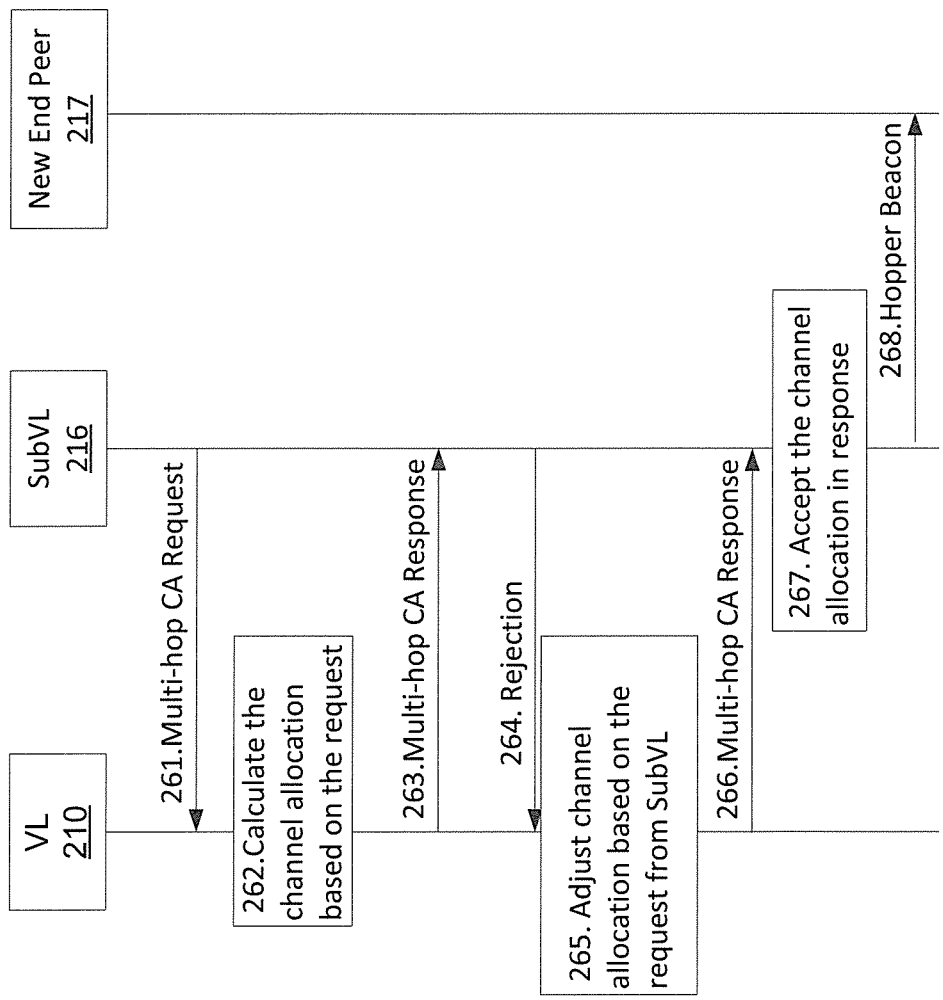
FIG. 17 illustrates procedures initiated at SubVL by sending multi-hop CA request message without SuperVL involved.

There can be scenarios where SubVLs may also initiate the multi-hop CA procedure by broadcasting poll message to its managed sub-network. The response to the received poll message is the same as described for VL initiated poll message and the criteria to choose the response is the same as well. For example, SubVL 218 may initiate the multi-hop CA procedure by broadcasting CA poll to its sub-network. FIG. 17 shows the procedure initiated at SubVL by sending multi-hop CA request message without SuperVL 209 involved. The following steps are performed, in view of the scenario above with regard to FIG. 14. At step 261, SubVL 216 sends the multi-hop CA request to VL 210 for channel resource to enable the communication between SubVL 216 and new end peer 217. At step 262, VL 210 determines a CA based on the request and finds out that it can work out a channel allocation to meet the request. At step 263, VL 210 sends multi-hop CA response to SubVL 216 with a CA. At step 264, SubVL 216 sends another multi-hop CA request to VL 210 for negotiation because it does not agree with the channel allocation. At step 265, VL 210 works out a new CA scheme based on the request of step 264. At step 266, VL 210 sends the multi-hop CA response with the new CA. At step 267, SubVL 216 receives the response and accepts the new allocation. At step 268, SubVL 216 broadcasts its beacon on the allocated channel to end peer 217.

Figure 18:
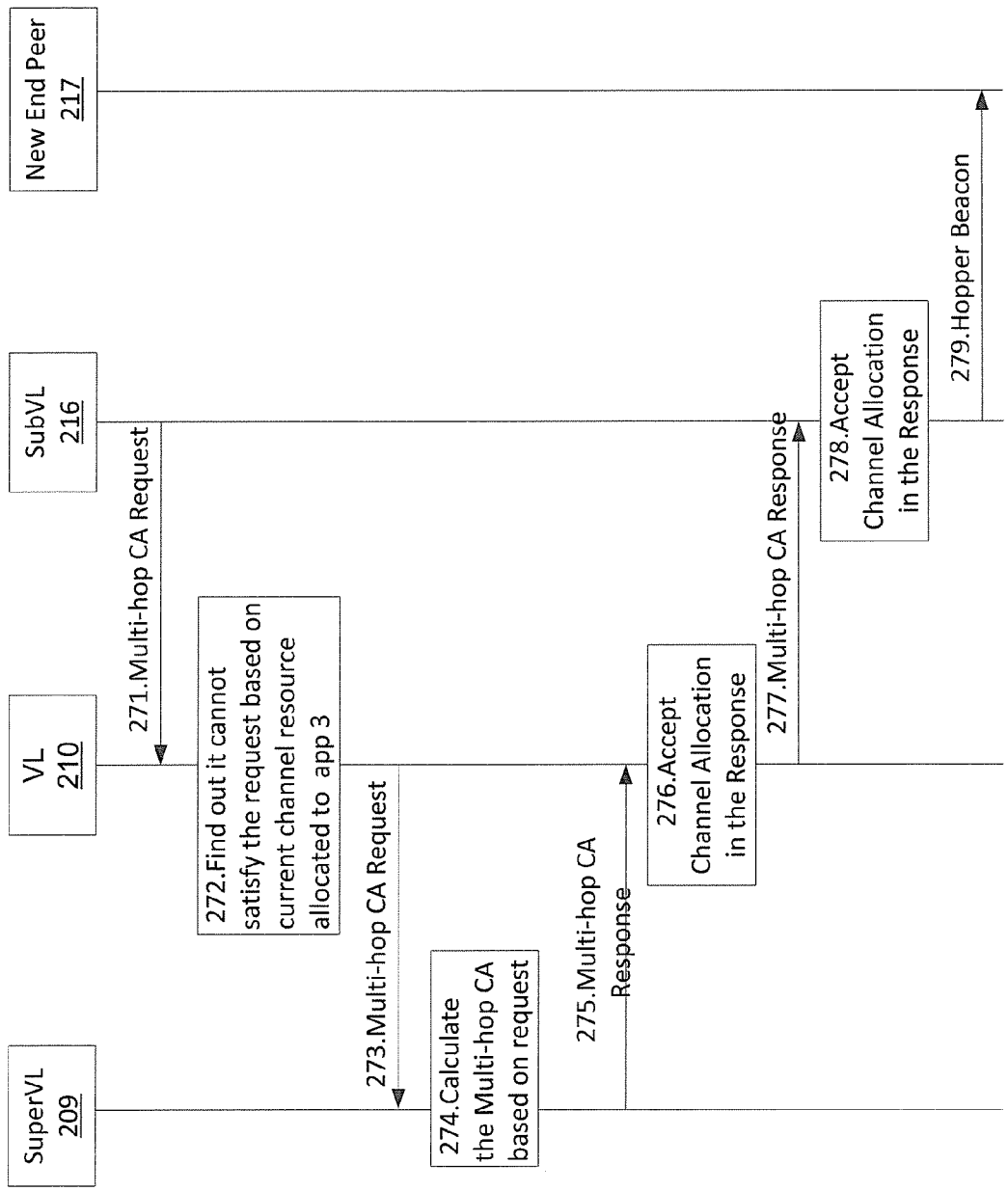
FIG. 18 illustrates the procedures initiated at VL by broadcasting multi-hop CA poll message with SuperVL involved.

FIG. 18 illustrates procedures initiated at SubVL by sending multi-hop CA request message with SuperVL 209 involved. The following steps are performed, in view of the scenario above with regard to FIG. 14. At step 271, SubVL 216 sends a multi-hop CA request to VL 210 for channel resource to enable communication with new end peer 217. At step 272, VL 210 receives the request, calculates a CA based on the request, and finds out that it could not work out a CA. At step 273, VL 210 sends the multi-hop CA request to SuperVL 209 for more channel resource. At step 274, SuperVL 209 determines a CA based on the request from VL 210. At step 275, SuperVL 209 sends multi-hop CA response to VL 210 with channel allocation. At step 276, VL 210 receives the response and accepts the channel allocation. At step 277, VL 210 sends the multi-hop CA response to SubVL 216 with the channel allocation based on the response from SuperVL 209. At step 278, SubVL 216 receives the response and accepts the channel allocation. At step 279, SubVL 216 broadcasts (or otherwise sends) its beacon on the allocated channel.

Figure 19A:
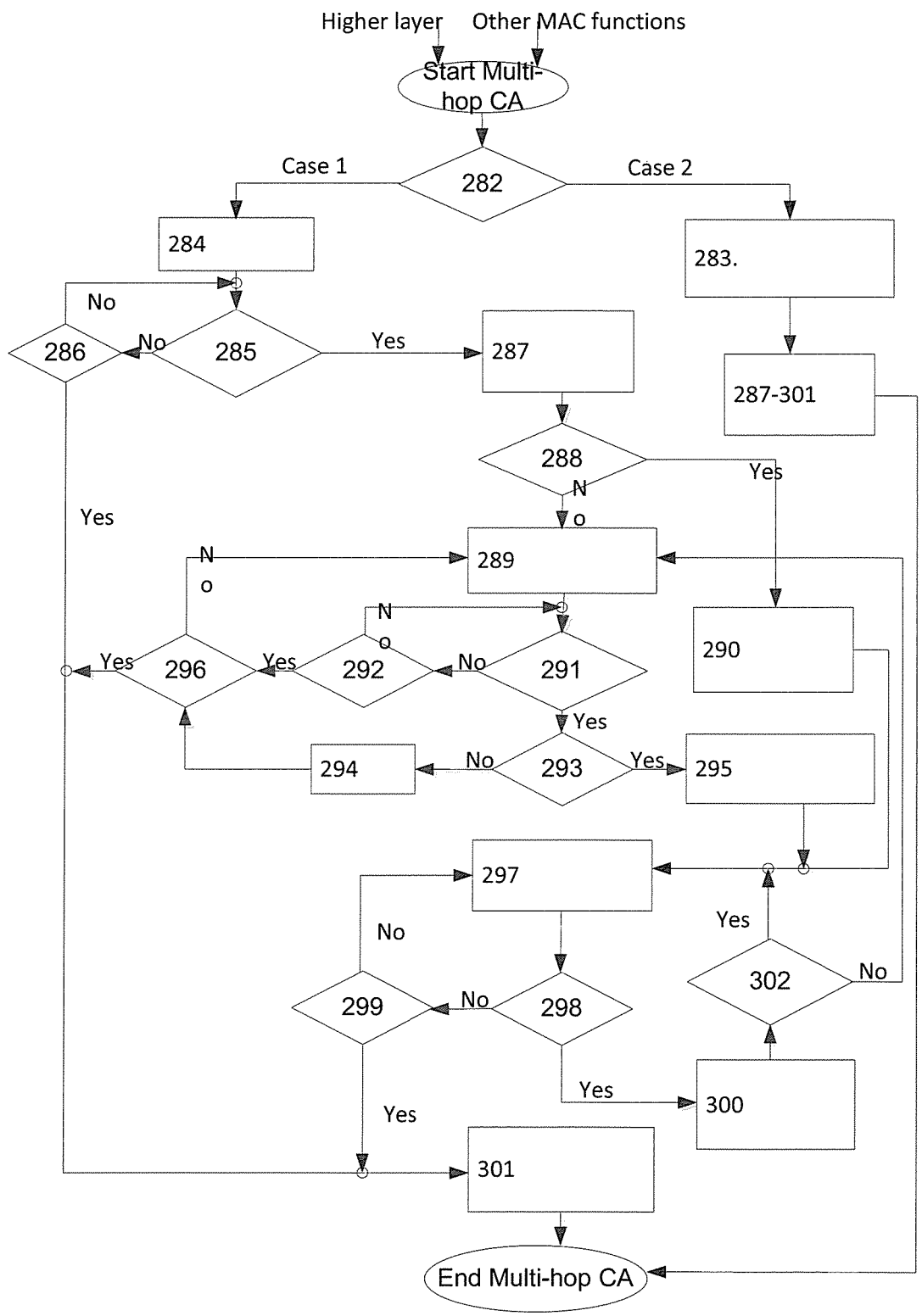
FIG. 19A illustrates an exemplary method of multi-hop channel allocation.
Figure 19B:
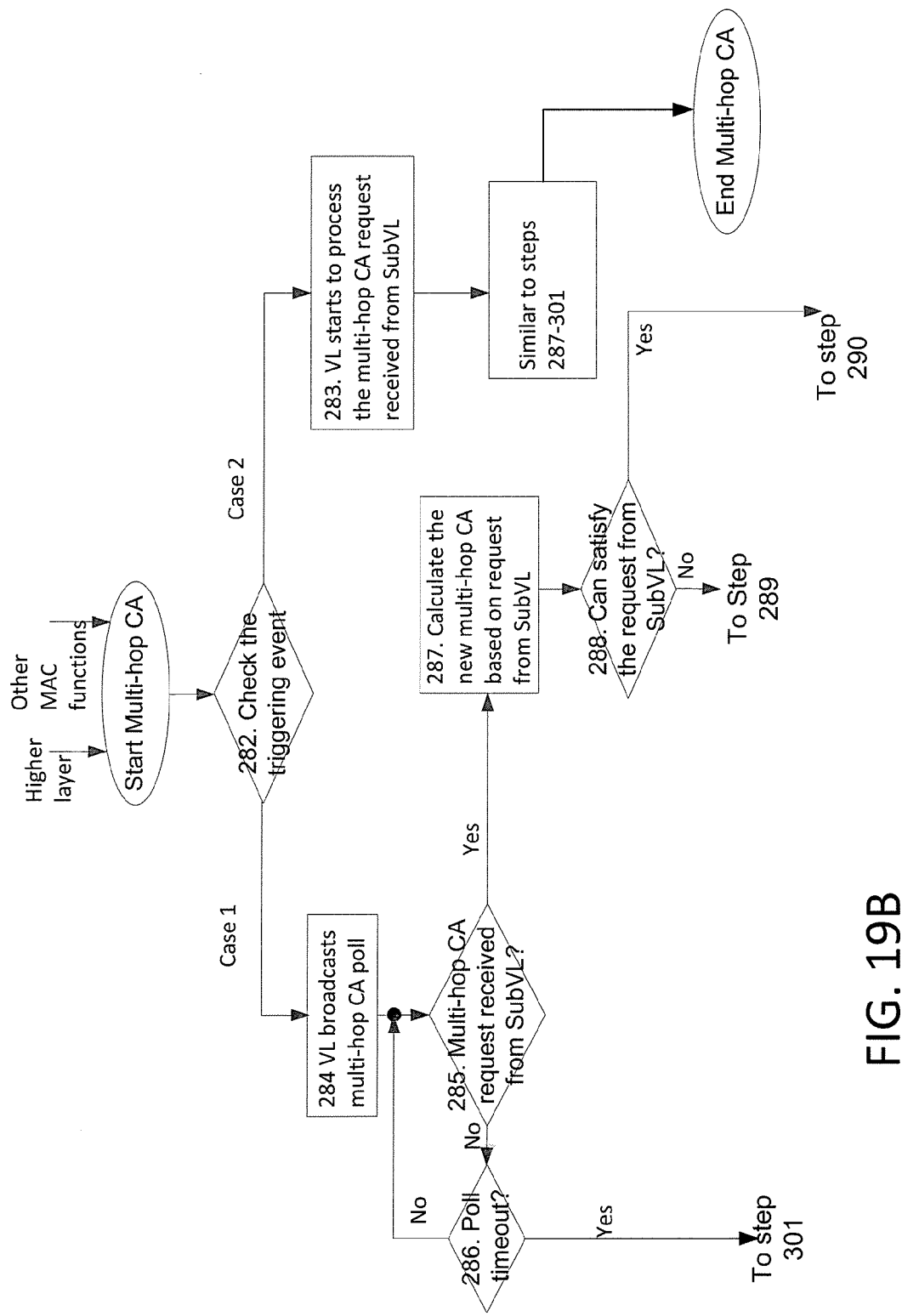
FIG. 19B illustrates an exemplary portion of the method illustrated in FIG. 19A for multi-hop channel allocation operated at VL under virtually centralized control.
Figure 19C:
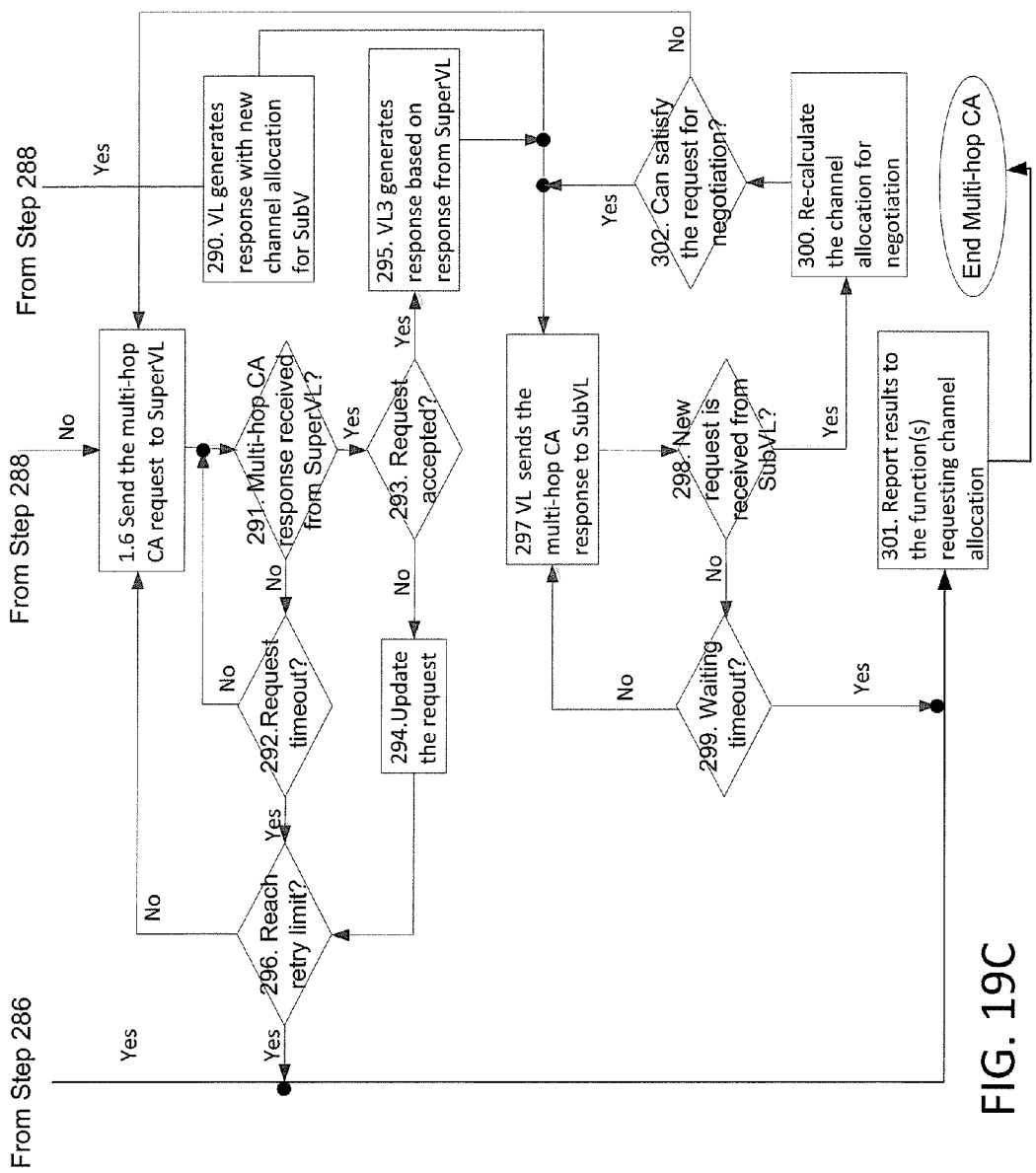
FIG. 19C illustrates an exemplary portion of the method illustrated in FIG. 19A for multi-hop channel allocation operated at VL under virtually centralized control, continued from FIG. 19B.

FIG. 19A illustrates an exemplary method of multi-hop channel allocation that is discussed in more detail herein. FIG. 19B-FIG. 19C is a divided version (due to space constraints) of FIG. 19A. FIG. 19B-FIG. 19C illustrate an exemplary method of multi-hop channel allocation operated at VL 210 under virtually centralized control. There multiple cases that may trigger the multi-hop CA procedure at VL 210. Two scenarios are associated with FIG. 19B-FIG. 19C. With regard to case 1 of FIG. 19B-FIG. 19C, VL 210 gets a request from higher layer or other MAC functions to broadcast poll. This case can be mapped to VL initiated multi-hop CA procedure via multi-hop CA poll. With regard to case 2 of FIG. 19B, VL 210 may receive a request from SubVL 214. This case can be mapped to SubVL initiated multi-hop CA procedure via multi-hop CA request.

With continued reference to FIG. 19B and FIG. 19C, at step 282 a triggering event is checked for a case 1 or case 2 scenario. For case 1, at step 284 VL 210 sends out a multi-hop CA poll message and waits for a request. At step 285, if VL 210 receives a multi-hop CA request from any SubVL, VL 210 executes step 287; otherwise, VL 210 executes step 286. At step 286, VL 210 checks if poll times out, if yes, which means no need to request channel resource for multi-hop communication, VL 210 goes to step 301; otherwise, VL 210 goes to step 285 to continue waiting for a request. At step 287, VL 210 receives the request from SubVL 214 and calculates the possible CA based on the request. At step 288, VL 210 determines if it can work out a CA to meet the request. If yes, goes to step 290; otherwise, goes to step 289. At step 290, VL 210 generates a response with CA it works out for SubVL 214. At step 291, VL 210 is waiting for response from SuperVL 209. If response arrives, VL 210 goes to step 293; otherwise goes to step 292. At step 292, VL 210 does no receive response from SuperVL 209 and checks if request is timed out, if yes goes to step 296; otherwise goes to step 291 to continue waiting.

At step 293, VL 210 gets response from SuperVL 209, and checks if request is accepted. If accepted, VL 210 goes to step 295; otherwise VL 210 goes to step 294. At step 294, if request was not accepted, VL 210 updates the request and goes to step 296 trying to re-send the request to SuperVL 209. At step 295, if request is accepted by SuperVL 209, VL 210 generates the response for SubVL 214 based on channel allocation indicated by SuperVL 209. At step 296, before sending another request, VL 210 checks if it already sent the request to SuperVL 209 for retry limit. If yes, VL 210 goes to step 301, otherwise VL 210 goes to step 289. At step 297, VL 210 sends the multi-hop CA response to SubVL 214, and waits for a period of time in case SubVL 214 does not agree with channel allocation (or other issues occur) and sends a new CA request for negotiation. At step 298, if VL 210 receives a new CA request from SubVL 214, which may mean SubVL 214 wants to negotiate for new channel allocation. VL 210 goes to step 300; otherwise goes to step 299. At step 299, VL 210 determines if it has waited within a threshold period for a new request from SubVL 214. If yes, then it may be presumed that SubVL 214 accepts the channel allocation, then VL 210 goes to step 301; otherwise, VL 210 would continue waiting.

With continued reference to FIG. 19C, at step 300, VL 210 determines the channel allocation based on the new request from SubVL 214. At step 302, if VL 210 can satisfy the new request, it generates the response with new allocation and goes to step 297; otherwise VL 210 goes to step 289 to ask SuperVL 209 for assistance in allocation. At step 301, VL 210 reports the results of CA procedure. There are multiple possible results, such as: 1) No request message received after broadcasting poll message; 2) Request to SuperVL 209 is not accepted before reaching the retry limit; or 3) Channel allocation is successfully completed for SubVL 214.

The following steps are with regard to case 2 of FIG. 19. For step 283, VL 210 starts to process the multi-hop CA request from SubVL 214. Thereafter steps would be similar to step 287 thru step 301 of FIG. 19.

Figure 20:
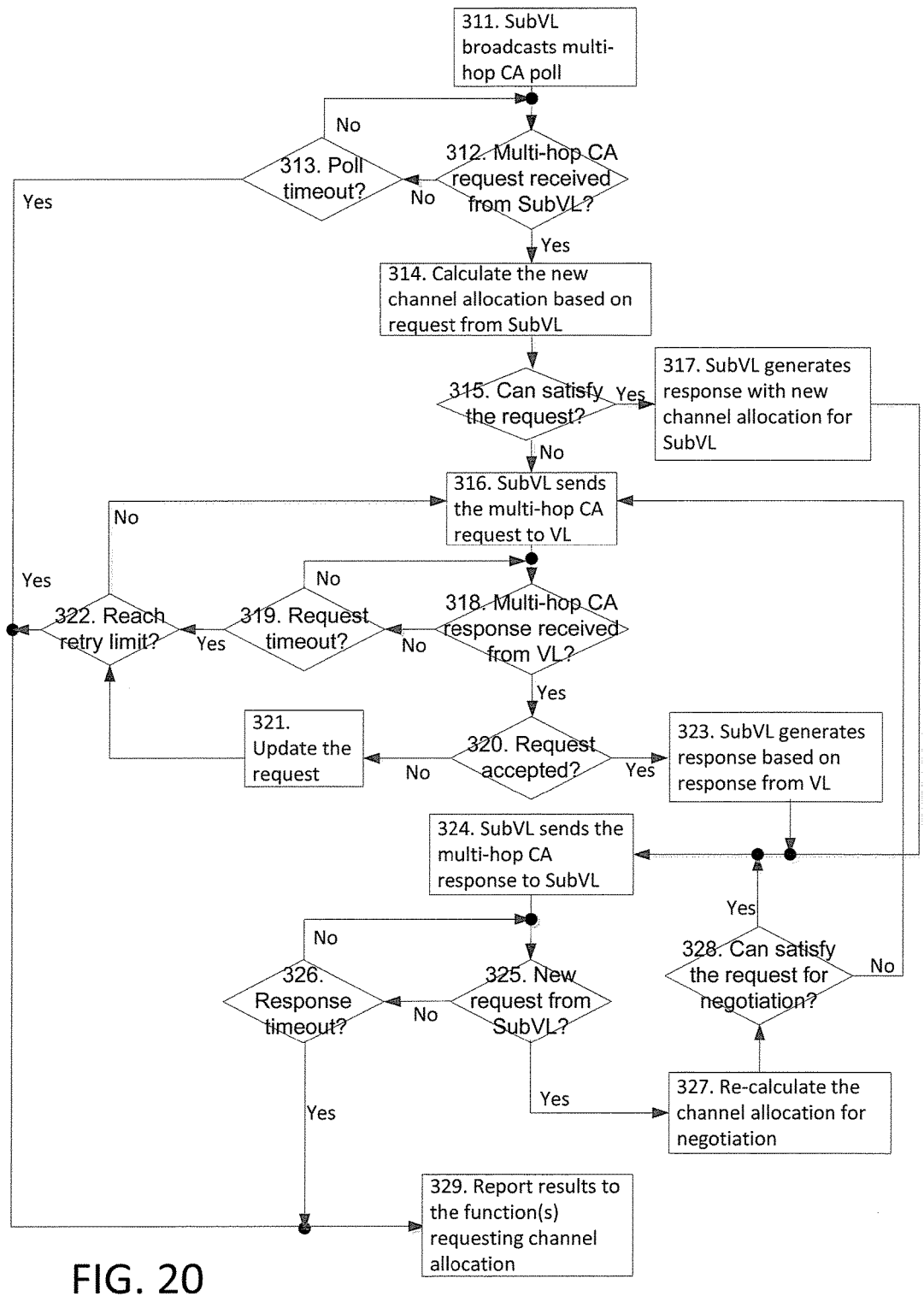
FIG. 20 illustrates operations to broadcast multi-hop CA poll at SubVL (Case A)

Below are exemplary cases for a multi-hop channel allocation procedure for SubVL 218. Some of these exemplary cases for triggering the multi-hop CA procedure at SubVL 218 are further illustrated in FIG. 20 thru FIG. 22. FIG. 20 is an exemplary illustration of case A. In case A, SubVL 218 is required to broadcast multi-hop CA poll to SubVL 219. This case may be mapped to the SubVL initiated multi-hop CA procedure via multi-hop CA poll. In case B, SubVL 218 receives a multi-hop CA request from SubVL 219. This case may be mapped to the SubVL initiated multi-hop CA procedure via multi-hop CA request. Case B is an alteration of case A, as discussed in more detail herein. FIG. 21 is an exemplary illustration of Case C. In case C, SubVL 218 is required to send multi-hop CA request to VL 210. This case may be mapped to the SubVL initiated multi-hop CA procedure via multi-hop CA request. FIG. 22 is an exemplary illustration of case D. In case D, SubVL 218 receives a multi-hop CA poll from VL 210. This case may be mapped to the VL initiated multi-hop CA procedure via multi-hop CA poll.

FIG. 20 gives the operation at SubVL 218, which broadcasts multi-hop CA poll. The following steps are performed for case A. At step 311, SubVL 218 sends (e.g., broadcasts) a multi-hop CA poll. At step 312, if SubVL 218 receives a multi-hop CA request message, it goes to step 314; otherwise, SubVL 218 goes to step 313. At step 313, SubVL 218 checks if the poll times out, if yes, there is no need to request channel resource for multi-hop communication in sub-network under SubVL 218 and SubVL 218 goes to step 329; otherwise, SubVL 218 goes to step 312 to continue waiting for request. At step 314, SubVL 218 receives the request from SubVL 219. SubVL 218 determines the possible channel allocations based on the request. At step 315, SubVL 218 determines if it can work out a channel allocation to meet the request. If yes, SubVL 218 goes to step 317; otherwise, SubVL 218 goes to step 316. At step 316, if SubVL 218 cannot work out a channel allocation to meet the request, SubVL 218 resorts sending a request to VL 210. At step 317, SubVL 218 works out a channel allocation to meet the request and generates a response. At step 318, SubVL 218 is waiting for response from VL 210. If response arrives, SubVL 218 goes to step 320; otherwise SubVL 218 goes to step 319.

With continued reference to FIG. 20, at step 319, SubVL 218 does not receive the response, so it checks if request has timed out, if yes SubVL 218 goes to step 322; otherwise SubVL 218 goes to step 318 to continue waiting. At step 320, SubVL 218 receives response from VL 210, and checks if request is accepted and if accepted, SubVL 218 goes to step 323; otherwise SubVL 218 goes to step 321. At step 321, if request is not accepted, SubVL 218 updates the request and goes to step 322 trying to re-send the request to VL 210. At step 322, before sending another request to VL 210, SubVL 218 may check if it already sent the request for retry limit. If yes, SubVL 218 goes to step 329, otherwise SubVL 218 goes to step 316.

At step 323, if the request is accepted by VL 210, SubVL 218 generates the response for SubVL 219 based on CA indicated by VL 210. At step 324, SubVL 218 sends the multi-hop CA response to SubVL 219 and waits for a period of time in case that SubVL 219 does not agree with channel allocation and sends a new request to SubVL 218. At step 325, if SubVL 218 receives a new request from SubVL 219, SubVL 218 goes to step 327; otherwise SubVL 218 goes to step 326. At step 326, if SubVL 218 does not receive new request from SubVL 219, it determines if a threshold time has been reached. If yes, then it is presumed that SubVL 219 accepts the channel allocation, SubVL 218 goes to step 329; otherwise, SubVL 218 continues waiting. At step 327, SubVL 218 receives a new request from SubVL 219, and determines the channel allocation based on the new request. At step 328, if SubVL 218 may be able to satisfy the new request, SubVL 218 generates the response with new allocation, and goes to step 324; otherwise SubVL 218 goes to step 316 to ask SuperVL 209 for assistance. At step 329, SubVL 218 reports the results of channel allocation procedure. The functions that trigger this flow of FIG. 20 may receive the reported results. For example, a higher layer may trigger this work flow periodically, or MAC layer may trigger this work flow if SubVL 218 receives a poll message from VL 210 and decides to rebroadcast the poll message to its sub network.

In case B, SubVL 218 receives a request from SubVL 219 which starts the processes for multi-hop. The remaining operations reflect steps 314-329 as illustrated in FIG. 20.

FIG. 21 provides operations at SubVL 218 which sends multi-hop CA request to VL 210. The following steps are performed for case C. At step 331, SubVL 218 sends (e.g., broadcasts) a multi-hop CA request to VL 210, and waits for a response. At step 332, if a response arrives, SubVL 218 goes to step 334; otherwise it goes to step 333. At step 333, if SubVL 218 does not receive a response from VL 210, it checks if the request is timed out. If timed out then SubVL 218 goes to step 336; otherwise SubVL 218 goes to step 332 to continue waiting. At step 334, if SubVL 218 receives a response from VL 210, it checks if request is accepted. If accepted, SubVL 218 goes to step 337; otherwise SubVL 218 goes to step 335. At step 33, if request is not accepted, SubVL 218 updates the request and goes to step 336 to try send another request to VL 210. At step 335, before sending another request, SubVL 218 checks if it already sent the request for retry limit. If yes, SubVL 218 goes to step 337, otherwise SubVL 218 goes to step 331. At step 337, SubVL 218 reports the results of channel allocation procedure. The functions that trigger this flow of FIG. 21 may receive the reported results.

FIG. 22 gives exemplary operations at SubVL 218 which receives multi-hop CA poll from VL 210. The following steps are performed for case D. At step 341, SubVL 218 starts to process the poll received from VL 210. At step 342, SubVL 218 checks if it needs to send request to VL 210. If yes, goes to Step 343; otherwise goes to step 344. At step 343, SubVL 218 sends request to VL 210 for channel resource. At steps 349, the steps follow the same operations as step 332-336 of FIG. 21. At step 344, SubVL 218 does not need to send request. SubVL 218 further checks if it needs to rebroadcast the poll. If yes, goes to step 345; otherwise goes to step 346. At step 345, SubVL 218 broadcasts the poll message to sub-network under its management. At steps 348, the steps follow the same operations as steps 312-328 in FIG. 21. At step 346, SubVL 218 discards the received poll since it does not need to send request to VL 210 and does not need to broadcast poll. At step 347, SubVL 218 reports the results of channel allocation procedure. The functions that trigger this flow of FIG. 22 may receive the reported results.

For distributed control, the call flows and flow charts are similar to the ones for virtually centralized control from the procedure perspective, but with some differences as discussed below. Below description of terminology used throughout, but particularly helpful in describing the differences. Peer-to-Peer (P2P) Communication may be considered infrastructure based (centralized) or infrastructure-less (distributed) communications among peers within proximity. An initiator may be considered the first peer to initiate the first service or application in proximity or the first peer to initiate any service or application in proximity. An Initiator could be either AppInitiator or ProxInitiator as defined below. The Initiator in Application (AppInitiator) may be considered the first peer to initiate a service or application which may or may not be the first service or application in proximity. With regard to centralized control, an AppInitiator may be the default VL for an application at the beginning of forming a P2PNW in a virtually centralized intra-P2PNW control system. The Initiator in Proximity (ProxInitiator) may be considered the first peer to initiate the first service or application in proximity. With regard to centralized control, A ProxInitiator may be the default SuperVL in proximity at the beginning of forming the first P2PNW in a virtually centralized inter-P2PNW control system.

For distributed control, who needs to reply to the channel allocation request may be an issue. In distributed control, not only ProxInitiator and AppInitiator, also the hoppers as well as end peers that can hear the request needed to determine if to accept a multi-hop CA request message. In virtually centralized control, only SubVL or VL needs to decide if to accept the request. In distributed mode, each node may have the right to make decision, such as reject a request. That is why every node in distributed mode that hears the request may respond. In virtually centralized control, the VL or SubVL is responsible for doing that.

For distributed control, who can request channel resource for multi-hop communication for an application may be an issue. For the frame structure of FIG. 10, in distributed control, ProxInitiator, AppInitiator, hoppers, and end peers that are aware of SF Common Period may broadcast multi-hop CA request message on the SF Common Period. In virtually centralized control, only VL is allowed to broadcast multi-hop CA request message on the SF Common Period. With regard to the frame structure of FIG. 12, in distributed control, ProxInitiator and AppInitiator, hoppers, and end peers that are aware of Frame Common Period within a frame may broadcast multi-hop CA request message for channel resource to enable multi-hop communication. In virtually centralized control, only VL is allowed to broadcast multi-hop CA request message for channel resource to enable multi-hop communication.

For distributed control, the way to handle the received multi-hop CA poll message may be an issue. In distributed control, a hopper may need to rebroadcast the poll received from any hopper. In virtually centralized control, a SubVL may need to rebroadcast the poll only coming from VL or SubVL that manages the receiver. For example, in FIG. 14, SubVL 219 may rebroadcast the poll message only from SubVL 218.

Discussed below are parameters that may be put into MAC frame to support the multi-hop communication and types of MAC frames used for multi-hop CA procedures. MAC frame here is MAC layer packet, the superframe/frame we discuss before may be considered repeated resource allocation for transmission. Here, we talk about the MAC layer packet, and the field/parameter in the packet. We define some types of MAC packet, such as CA poll, CA request/response. These parameters are proposed to generally support multi-hop communication and not to a specific type of MAC packet.

A multi-hop enabling indication parameter may be used. A multi hop enabling indication parameter is a flag (e.g., 1-bit flag) to indicate if the multi-hop communication is allowed in P2PNW for an application. If, for example, the flag is set true, multi-hop communication is enabled (allowed); otherwise, multi-hop communication is disabled (not allowed). The multi hop enabling indication parameter may be inserted to the places, such as the MAC header, Information element, or the MAC payload. Several types of management MAC frames could include the multi hop enabling indication parameter. The examples of the types of management frames may be an application beacon, relayed beacon, discovery request, discovery response, association/disassociation/reassociation request, association/disassociation/reassociation response, channel allocation request, or channel allocation response.

A multi-hop period length parameter may be used. Multi-hop period length parameter indicates the total length of the multi-hop period in frame structures. The multi-hop period length parameter may be inserted as part of MAC payload or information element. For the frame structure of FIG. 10, the SF beacon includes the multi-hop period length parameter. For the frame structure of FIG. 12, the application beacon or frame beacon at beginning of each frame includes the multi-hop period length parameter.

A parameter for multi-hop beacon list may be used. The multi-hop beacon list may include a list of the beacons that are allocated in the multi-hop period. This list may be mapped to the application list in the multi-hop period, e.g., each beacon indicates a certain application. The multi-hop beacon list may be used by peer to identify which application has been allocated channel in multi-hop period and when the channel starts. The multi-hop beacon list may be inserted as part of a MAC payload or information element. For the frame structure of FIG. 10, the SF beacon may include the multi-hop beacon list. For the frame structure of FIG. 12, the application beacon (frame beacon) at beginning of each frame includes the multi-hop beacon list.

A hop limit parameter may be used. Hop limit indicates the maximum number of hops allowed for the multi-hop communication. This parameter may be used to control the network coverage, and to meet the quality of service (QoS) requirement (e.g., latency). The hop limit parameter may be inserted into places, such as the MAC header, Information element, or the MAC payload. Several types of management MAC frames could include the hop limit parameter. Examples of the types of management frames may be a SF beacon, application beacon, relayed beacon, discovery request, discovery response, association/disassociation/reassociation request, association/disassociation/reassociation response, channel allocation request, or channel allocation response.

The associated hopper information parameter may be used. It indicates the information of the hopper selected. For example, SubVL 219 reports this parameter with information of SubVL 218. The associated hopper information parameter may be inserted to the MAC payload or information element. Several types of management MAC frames could include the associated hopper information parameter. The types of management frames may be a relayed beacon, discovery request, discovery response, association/disassociation/reassociation request, association/disassociation/reassociation response, channel allocation request, or channel allocation response.

The available hopper list parameter may be used. It contains all the discovered Hoppers by a peer. For example, SubVL 219 in FIG. 14 constructs this list with all SubVLs that it could discover. The available hopper list could help peers to select the Hoppers. The available hopper list can be inserted to the MAC payload or information element. Several types of management MAC frames may include the available hopper list, such as a relayed beacon, discovery request, discovery response, association/disassociation/reassociation request, or association/disassociation/reassociation response.

Multi-hop channel allocation poll frame is a parameter that may be used by the Hoppers to poll the P2P network or sub-network to see if it is necessary to request channel for multi-hop communication. There are multiple possible responses at the receiver, and how to determine the response is explained above. The possible response may include send multi-hop CA request message to sender, rebroadcast the poll message; or discard the poll (e.g., ignore the poll). The potential contents in MAC payload of multi-hop CA poll messages are listed in Table 2. In an example, MAC header may contain the address, basic application information, and network ID information, while MAC payload may contain the information regarding the multi-hop communication and poll procedure.

TABLE 2

Parameters in Multi-hop CA Poll Frame

| Parameter | Description |
|---|---|
| Poll Policy | Indicate if the receiver is allowed to rebroadcast the poll message |
| Channel Resource for Multi-hop | Indicate where the available channel resource for multi-hop communication Or the channel allocation for multi-hop communication. For example, SubVL 218 has the channel to communicate with SubVL 219, which just becomes a Hopper. SubVL 218 could broadcast poll with above information, so that SubVL 219 could send request based on the information. |
| Poll Time Out | Indicate the maximum amount of time sender will wait for any request for the poll. After time out, any request will be ignored |

A parameter with regard to a multi-hop channel allocation request frame may be used to indicate if multi-hop channel allocation is needed for a network/sub-network or to indicate the specific channel allocation requirement, such as how much channel resource is needed. The potential contents in multi-hop CA request message are listed in Table 3. MAC Header contains the address, basic application information and network ID information. MAC payload contains the information regarding the multi-hop communication and specific requirement for channel resource.

TABLE 3

Parameters in Multi-hop CA Request Frame

| Parameter | Description |
|---|---|
| Request Origin | Indicate if the request is the response to a poll message or is initiated by a SubVL. |
| Required Channel Resource | Indicate the specific requirements for channel resource. This field may consist of multiple sub-fields, for example: How much resource is required, e.g. slot numbers The QoS requirement for multi-hop communication, e.g. interference level Number of superframes required (repetition) |

A parameter with regard to multi-hop channel allocation response message may be used to reply to the multi-hop CA request message, containing the specific channel allocation for multi-hop communication if request is accepted, or rejection reason and further actions. The potential contents in multi-hop CA response message are listed in Table 4. MAC Header contains the address, basic application information and network ID information. MAC payload contains the information regarding the multi-hop communication, and specific channel allocation regarding the request.

TABLE 4

Parameters in Multi-hop CA Response Frame

| Parameter | Description |
|---|---|
| Decision | Indicate if the request message is accepted or not |
| Channel Allocation | Specify the channel allocation if request is accepted. For example, Where to start the multi-hop communication The duration of the allocated channel resource Number of superframes granted (repetition) |
| Reject Reason | Specify the reject reason if request is not accepted. Could also indicate the further actions. For example, The requestor could re-send an updated request The responder could send request to its Hopper for more channel resource, e.g. SubVL 218 rejects the request coming from SubVL 219, and sends request to VL 210. |

FIG. 23A is a diagram of an example machine-to machine (M2M), Internet of Things (IoT), or Web of Things (WoT) communication system 10 in which one or more disclosed concepts may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 23A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 23A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 23B, the illustrated M2M service layer 22 (e.g., context-based service or application as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 23B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using methods for multi-hop frame formation for P2P communications, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The methods for multi-hop for P2P communications of the present application may have or interact with components implemented as part of a service layer. The service layer is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and one M2M use a service layer that may contain the methods for multi-hop for P2P communications of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the methods for multi-hop for P2P communications of the present application can be implemented as part of an M2M network that uses a Service Oriented Architecture (SOA) and/or a resource-oriented architecture (ROA) to access services such as the methods for multi-hop for P2P communications of the present application.

FIG. 23C is a system diagram of an example M2M device 30, such as an M2M terminal device 18 or an M2M gateway device 14 for example. As shown in FIG. 23C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g. VL 131, VL 121, end peer 124, hopper 134, Super VL 209, VL 210, end peer 211, end peer 213, SubVL 214, SubVL 216 and others) may be an exemplary implementation that performs the disclosed systems and methods for multi-hop P2P communications.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 23C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the messages for multi-hop for P2P communications in some of the examples described herein are negative or positive (e.g., multi-hop beacons, multi hop enabling indication parameter, other parameters in the MAC frame that support multi-hop communication, among other frame related parameters as discussed herein), or otherwise indicate a status of multi-hop communication and associated components. The control lighting patterns, images, or colors on the display or indicators 42 may be reflective of the status of any of the method flows or components in the FIGs (e.g., FIG. 9-FIG. 22) illustrated or discussed herein. Disclosed herein are messages and procedures of multi-hop P2P communication as well as resource semantics information management. The messages and procedures can be extended to provide interface/API for users to request resource-related resources via an input source (e.g., speaker/microphone 38, keypad 40, or display/touchpad 42) and request, configure, or query multi-hop P2P communication parameters or resources (e.g., Table 2-Table 4, and throughout), among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 23D is a block diagram of an exemplary computing system 90 on which, for example, the M2M service platform 22 of FIG. 23A and FIG. 23B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for multi-hop communication, such as receiving multi-hop P2P communication parameters (e.g., multi-hop period length parameter).

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 23A and FIG. 23B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples (e.g., skipping steps of example methods, combining steps from other example methods, or adding steps to example methods) that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   memory coupled with the processor, the memory comprising executable instructions that when executed by the processor cause the processor to effectuate operations comprising:
   providing a superframe for peer-to-peer communication, the superframe comprising:
      an indication of a multi-hop period dedicated for multi-hop peer-to-peer communication from a virtual leader of a peer-to-peer network, the multi-hop period comprising a plurality of multi-hop frames that are dedicated to a plurality of respective different applications.

2. The apparatus of claim 1, further operations comprising providing a multi-hop channel allocation poll message to poll the peer-to-peer network to determine if a hopper request channels resources for multi-hop peer-to-peer communication, wherein the hopper is a peer device that relays data to other peer devices in proximity of the peer device in order to extend radio coverage.

3. The apparatus of claim 1, further operations comprising providing a parameter that indicates if the multi-hop peer-to-peer communication is allowed in the peer-to-peer network for an application.

4. The apparatus of claim 1, further operations comprising providing a parameter that indicates the total length of the multi-hop period in the superframe.

5. The apparatus of claim 1, further operations comprising providing a parameter that indicates a list of beacons that are allocated in the multi-hop period.

6. The apparatus of claim 1, further operations comprising providing a parameter that indicates a maximum number of hops allowed for the multi-hop peer-to-peer communication.

7. The apparatus of claim 1, further operations comprising providing a parameter that indicates when multi-hop channel allocation is needed for the peer-to-peer network.

8. The apparatus of claim 1, further operations comprising providing a parameter that indicates specific channel allocation requirement for a peer device of the apparatus.

9. A method comprising:
   providing a superframe for peer-to-peer communication, the superframe comprising:
      an indication of a multi-hop period dedicated for multi-hop peer-to-peer communication from a virtual leader of a peer-to-peer network, the multi-hop period comprising a plurality of multi-hop frames that are dedicated to a plurality of respective different applications.

10. The method of claim 9, further comprising providing a multi-hop channel allocation poll message.

11. The method of claim 9, further comprising providing a parameter that indicates if the multi-hop peer-to-peer communication is allowed in the peer-to-peer network for an application.

12. The method of claim 9, further comprising providing a parameter that indicates the total length of the multi-hop period in the superframe.

13. The method of claim 9, further comprising providing a parameter that indicates a list of beacons that are allocated in the multi-hop period.

14. The method of claim 9, further comprising providing a parameter that indicates a maximum number of hops allowed for the multi-hop peer-to-peer communication.

15. The method of claim 9, further comprising providing a parameter that indicates when multi-hop channel allocation is needed for the peer-to-peer network.

16. A non-transitory computer readable storage medium comprising computer executable instructions that when executed by a computing device cause said computing device to effectuate operations comprising:

provide a superframe for peer-to-peer communication, the superframe comprising:

an indication of a multi-hop period dedicated for multi-hop peer-to-peer communication from a virtual leader of a peer-to-peer network, the multi-hop period comprising a plurality of multi-hop frames that are dedicated to a plurality of respective different applications.

17. The computer readable storage medium of claim 16, further operations comprising a providing a multi-hop channel allocation poll message to poll the peer-to-peer network to determine if a hopper request channels resources for multi-hop peer-to-peer communication, wherein the hopper is a peer device that relays data to other peer devices in proximity of the peer device in order to extend radio coverage.

18. The computer readable storage medium of claim 16, further operations comprising providing a parameter that indicates if the multi-hop peer-to-peer communication is allowed in the peer-to-peer network for an application.

19. The computer readable storage medium of claim 16, further operations comprising providing a parameter that indicates the total length of the multi-hop period in the superframe.

20. The computer readable storage medium of claim 16, further operations comprising providing a parameter that indicates a list of beacons that are allocated in the multi-hop period.

* * * * *